(12) United States Patent
Rodriguez et al.

(10) Patent No.: US 11,580,837 B2
(45) Date of Patent: Feb. 14, 2023

(54) HEAD ORIENTATION TRAINING DEVICES

(71) Applicants: Pedro Pachuca Rodriguez, Pleasanton, CA (US); James Young Li, Sterling, VA (US); Mason Seaton Freeny, Fresno, CA (US)

(72) Inventors: Pedro Pachuca Rodriguez, Pleasanton, CA (US); James Young Li, Sterling, VA (US); Mason Seaton Freeny, Fresno, CA (US)

(73) Assignee: Pedro Pachuca Rodriguez, Pleasanton, CA (US)

( * ) Notice: Subject to any disclaimer, the term of this patent is extended or adjusted under 35 U.S.C. 154(b) by 0 days.

(21) Appl. No.: 17/221,158

(22) Filed: Apr. 2, 2021

(65) Prior Publication Data

US 2021/0327241 A1 Oct. 21, 2021

Related U.S. Application Data

(60) Provisional application No. 63/012,255, filed on Apr. 19, 2020.

(51) Int. Cl.
| | |
|---|---|
| *G08B 21/22* | (2006.01) |
| *G08B 21/02* | (2006.01) |
| *G06F 3/16* | (2006.01) |
| *G08B 6/00* | (2006.01) |

(Continued)

(52) U.S. Cl.
CPC ............. *G08B 21/02* (2013.01); *G06F 3/16* (2013.01); *G08B 3/10* (2013.01); *G08B 5/36* (2013.01); *G08B 6/00* (2013.01)

(58) Field of Classification Search
CPC ............ A61B 2503/10; A61B 2505/09; A61B 2560/0223; A61B 2562/0219; A61B 5/1116; A61B 5/1122; A61B 5/1126; A61B 5/6803; A63B 2024/0012; A63B 2071/0625; A63B 2209/10; A63B 2230/62; A63B 24/0003; A63B 69/3608; A63B 69/3629; G06F 3/011; G06F 3/012;
(Continued)

(56) References Cited

U.S. PATENT DOCUMENTS

| | | | |
|---|---|---|---|
| 4,303,241 A | 12/1981 | Burroughs | |
| 5,150,104 A | 9/1992 | Thomas | |
| 5,300,921 A | 4/1994 | Hoch et al. | |

(Continued)

FOREIGN PATENT DOCUMENTS

| | | |
|---|---|---|
| CA | 2555249 | 8/2005 |
| CA | 2548933 | 11/2007 |

(Continued)

*Primary Examiner* — Daniel Previl
(74) *Attorney, Agent, or Firm* — Edlavitch Law PLLC

(57) ABSTRACT

Described herein are head orientation training devices for sports training and systems including such devices. A head orientation training device (HOTD) can include a position sensor configured to sense a tilt of the device, continually, while the device is activated. The HOTD can also include a computing device, configured to retrieve the tilt of the device from the position sensor, repeatedly, while the apparatus is activated. Also, the computing device of the HOTD can be configured to activate an alarm (such an audible or a visual alert) when the tilt of the apparatus exceeds a tilt threshold. The tilt threshold can be user definable as well.

20 Claims, 19 Drawing Sheets

(51) Int. Cl.
 *G08B 5/36* (2006.01)
 *G08B 3/10* (2006.01)

(58) Field of Classification Search
 CPC ............ G06F 3/016; G06F 3/16; G06F 3/167;
 G08B 21/02; G08B 3/10; G08B 5/36;
 G08B 6/00
 USPC ........ 340/573.1, 538.11, 521, 539.1, 538.15,
 340/539.22, 568.1, 588, 3.9, 825.23
 See application file for complete search history.

(56) References Cited

U.S. PATENT DOCUMENTS

| | | | |
|---|---|---|---|
| 5,509,836 A * | 4/1996 | Ogasawara | B63H 20/00 440/76 |
| 5,521,653 A | 5/1996 | Anderson | |
| 5,588,513 A * | 12/1996 | Lin | A45C 13/262 280/37 |
| 5,713,144 A * | 2/1998 | Haraoka | E02F 9/26 701/50 |
| 5,783,451 A * | 7/1998 | Van Praet | B01L 13/02 422/562 |
| 5,916,181 A | 6/1999 | Socci et al. | |
| 6,730,047 B2 | 5/2004 | Socci et al. | |
| 7,326,060 B2 | 2/2008 | Seiller | |
| 7,509,691 B1 | 3/2009 | Wingate | |
| 7,648,430 B2 | 1/2010 | Gagnon | |
| 8,062,037 B1 | 11/2011 | Chapa, Jr. et al. | |
| 8,284,070 B2 | 10/2012 | Chaudhari et al. | |
| 8,382,685 B2 * | 2/2013 | Vaccari | A42B 3/046 600/595 |
| 8,568,256 B1 | 10/2013 | Richardson | |
| 9,927,617 B2 * | 3/2018 | Morimoto | A61B 5/742 |
| 9,956,465 B1 | 5/2018 | Rodriguez | |
| 10,019,881 B2 | 7/2018 | Chung et al. | |
| 10,751,592 B1 * | 8/2020 | Roberts | A42B 3/0406 |
| 2007/0015611 A1 * | 1/2007 | Noble | A61B 5/1126 473/450 |
| 2007/0147027 A1 | 6/2007 | Chuang | |
| 2012/0157243 A1 | 6/2012 | Gallo | |
| 2012/0210498 A1 | 8/2012 | Mack | |
| 2014/0115759 A1 * | 5/2014 | Tomlin | A63B 71/10 340/689 |
| 2016/0121192 A1 | 5/2016 | Mendoza | |
| 2019/0037956 A1 * | 2/2019 | Dixon | A42B 3/20 |

FOREIGN PATENT DOCUMENTS

| | | |
|---|---|---|
| CA | 2941396 | 3/2008 |
| WO | 2013140744 | 9/2013 |

* cited by examiner

1900

```
┌─────────────────────────────────────────────────────────────────┐
│         tilting, by a user, the HOTD to a tilt threshold        │
│                              1902                                │
└─────────────────────────────────────────────────────────────────┘
                                 │
                                 ▼
┌─────────────────────────────────────────────────────────────────┐
│   receiving, by the UI, a user input to notify the HOTD to       │
│                  configure the tilt threshold                    │
│                              1904                                │
└─────────────────────────────────────────────────────────────────┘
                                 │
                                 ▼
┌─────────────────────────────────────────────────────────────────┐
│      receiving, by the computing device, the user input from    │
│                             the UI                              │
│                              1906                               │
└─────────────────────────────────────────────────────────────────┘
                                 │
                                 ▼
┌─────────────────────────────────────────────────────────────────┐
│  setting, by the computing device, the tilt threshold of the     │
│  HOTD, in response to receiving the user input, by retrieving   │
│  the tilt of the HOTD immediately after the user input          │
│                  is received by the computing device            │
│                              1908                                │
└─────────────────────────────────────────────────────────────────┘
```

FIG. 19

HEAD ORIENTATION TRAINING DEVICES

CROSS-REFERENCE TO RELATED APPLICATIONS

The present application claims the benefit of priority from U.S. Provisional Patent Application No. 63/012,255, filed on Apr. 19, 2020 and entitled "Electromechanical head-tracking sports vision training device to enhance awareness, safety, and performance for the game of hockey", the entire disclosure of which application is hereby incorporated herein by reference.

TECHNICAL FIELD

The present disclosure relates to head orientation training devices as well as enhancements thereof.

BACKGROUND

When training an individual to play a sport, it is important to train them to look up and be aware of the field of play, teammates, opponents, and the position of the game objects such as a ball or a hockey puck. A few items have tried to accomplish this task with little to no electronics. Known devices approach the problem in a mechanical way and substantially physically limit the player's vision to a large, unplayable degree which can be dangerous. Upon disuse of these devices, a player may know how to play without requiring the initially blocked portion of their field of vision, but they are not necessarily conditioned to do so. These devices are standalone and may be dangerous to wear during gameplay as they are near to a player's eyes.

Some training devices do use electronics. For instance, devices are known that use light and the Hall effect to warn against unsafe head positions within a helmet. Also, devices are known to measure head orientation via a head-mounted-device but for medicinal/surgery purposes. Such devices are fragile and not intended for use in sports.

While such known devices fulfill their particular objectives and requirements, they do have problems. For instance, they do not provide electromechanical techniques to train and condition players of sports to look up and be aware of their surroundings, teammates, opponents, and sports objects with purpose of increasing safety, reducing injuries, and improving performance. Thus, there remains a need for an electromechanical device that may be used as a training aid to condition players to look up and be aware of their surroundings without the problems mentioned in this background section and other parts of the application as well as other technical problems not described herein but recognized by those skilled in the art.

SUMMARY

Described herein are improved apparatuses, systems and methods for head orientation training. For example, described herein are improved apparatuses, systems and methods for head orientation training for sports. The techniques disclosed herein can be used to improve head orientation training to resolve the technical problems mentioned in the background section and other parts of the application as well as other technical problems not described herein but recognized by those skilled in the art.

With respect to some embodiments, disclosed herein are head orientation training devices for sports training and systems including such devices. A head orientation training device (HOTD) can include a position sensor configured to sense a tilt of the device, continually, while the device is activated. The HOTD can also include a computing device, configured to retrieve the tilt of the device from the position sensor, repeatedly, while the apparatus is activated. Also, the computing device of the HOTD can be configured to activate an alarm (such an audible or a visual alert) when the tilt of the apparatus exceeds a tilt threshold. The tilt threshold can be configurable in some embodiments. Also, The tilt threshold can be user definable.

With respect to some embodiments, disclosed herein are computerized methods for head orientation training such as head orientation training for sports, as well as a non-transitory computer-readable storage medium for carrying out technical operations of the computerized methods. The non-transitory computer-readable storage medium has tangibly stored thereon, or tangibly encoded thereon, computer readable instructions that when executed by one or more devices (e.g., one or more personal computers or servers) cause at least one processor to perform a method for improved head orientation training such as head orientation training for sports.

In some embodiments, the techniques and systems disclosed herein can provide an electromechanical wearable sports vision training device (e.g., an electromechanical facemask-mounted sports vision training device) which provides visual cues via an indicator light-emitting diode (LED) and audio cues via a buzzer as a warning the player at a variety of angle thresholds and time thresholds, of a sustained orientation of the helmet, hat, headgear or facemask indicative of focus placed on the game object on the ice rink floor or other surface and indicative of a lack of awareness about the player's surroundings. Also, the techniques and systems disclosed herein can condition a player to establish the positive habit of disallowing constant or overly-frequent focus on a ball or a hockey puck or other sports object on the hockey rink floor or sports field during training, practice, or gameplay. Also, the techniques and systems disclosed herein can promote the positive habit of a player being aware of his or her surroundings including but not limited to teammates, other players, coaches, referees, goals, and rink borders in order to decrease the likelihood of a player being unaware of an oncoming hit or any other negative situation during gameplay in order to reduce the frequency and severity of injuries during sports training, practice, and gameplay. Also, the techniques and systems disclosed herein can integrate with a mobile application or web application on a mobile device or other piece of electronics that can communicate and gather data from the headgear-mounted device for the purposes of presenting the data in a time-series or statistical manner to any interested parties. Also, the techniques and systems disclosed herein can include an electromechanical wearable sports vision training device that includes a main circuit with components including an indicator LED, an embedded board with a buzzer, a detector, and three or two buttons; the encasement for such a circuit; and a mechanism for positioning the device on a sports helmet's facemask or another type of headgear such that the device can provide visual and aural cues as intended to function. Also, the techniques and systems disclosed herein can include a method of training individuals to play the game of hockey or another sport including the steps of providing at least one member wearing the invented device as intended, having that player respond accordingly to the visual and aural cues generated by the invented device, and a separate or the same member adjusting or conforming to a training, practice, or gameplay regime according to data provided by the device on a mobile or web application accessible by any interested party. With respect to some embodiments, other details of a wearable sports vision training device, as well as other objects and advantages attendant thereto, are set forth in the following detailed description and the accompanying drawings.

Although many of the examples illustrated herein relate to a hockey facemask-mounted sports vision training device, it is to be understood the apparatuses, systems, and methods described herein can analogously apply to head orientation training for other sports and activities as well as the wearable sports vision training device can be adapted to mount to a facemask of any type of sports helmet, or a sports helmet without a facemask, or even any type of headgear of a player or user such as a headband or a hat. Also, the wearable sports vision training device is also referred to herein as a head orientation training device or a HOTD since such a device could be used for other head orientation training purposes.

These and other important aspects of the invention are described more fully in the detailed description below. The invention is not limited to the particular methods and systems described herein. Other embodiments can be used and changes to the described embodiments can be made without departing from the scope of the claims that follow the detailed description.

BRIEF DESCRIPTION OF THE DRAWINGS

The present disclosure will be understood more fully from the detailed description given below and from the accompanying drawings of various embodiments of the disclosure.

FIGS. 17, 18, and 19 illustrate example methods in accordance with some embodiments of the present disclosure.

DETAILED DESCRIPTION OF EXAMPLE EMBODIMENTS

Details of example embodiments of the invention are described in the following detailed description with reference to the drawings. Although the detailed description provides reference to example embodiments, it is to be understood that the invention disclosed herein is not limited to such example embodiments. But to the contrary, the invention disclosed herein includes numerous alternatives, modifications and equivalents as will become apparent from consideration of the following detailed description and other parts of this disclosure.

Figure 1:
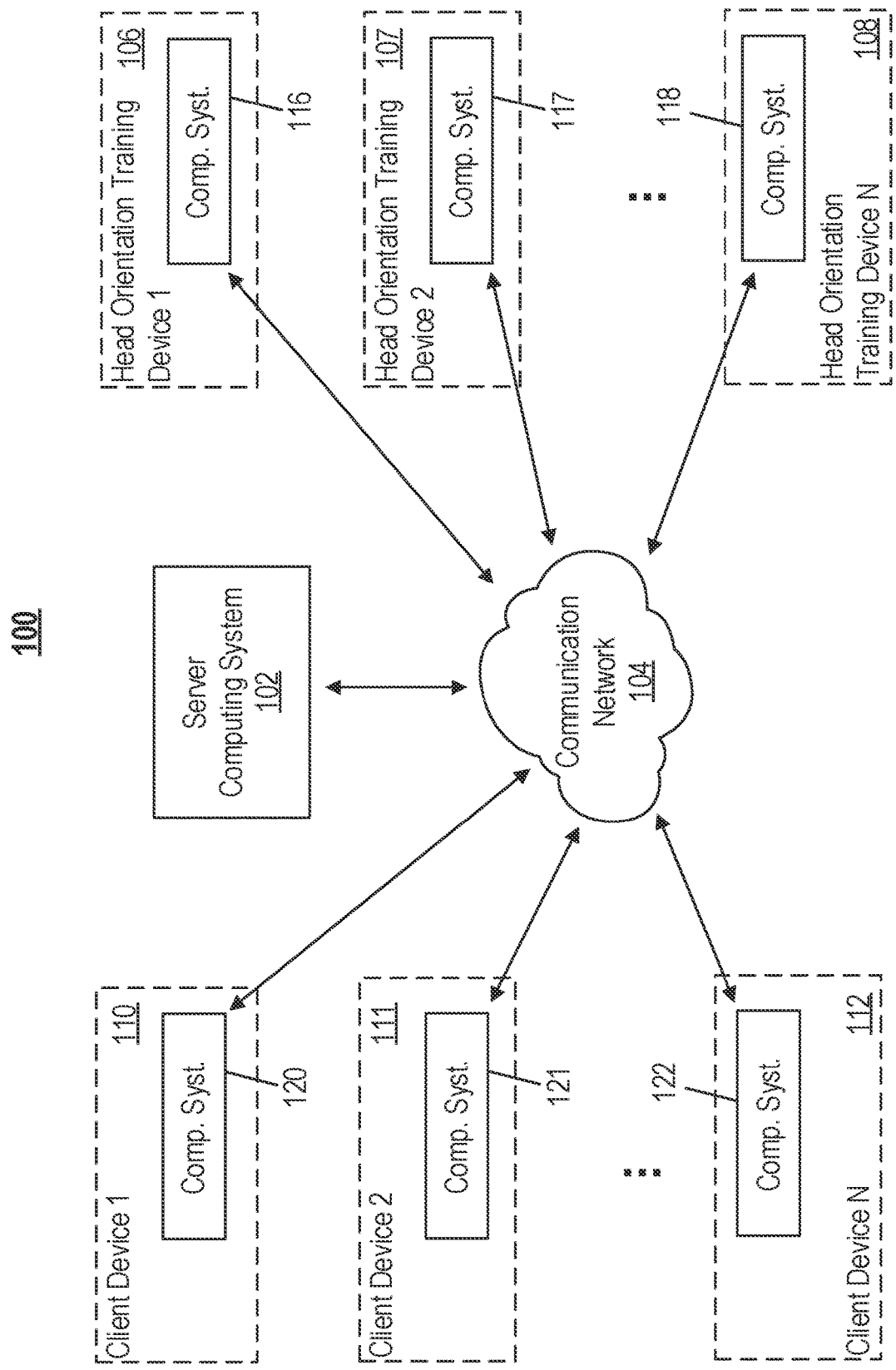
FIG. 1 illustrates an example network of computing systems including computing systems of head orientation training devices, in accordance with some embodiments of the present disclosure.

FIG. 1 illustrates network 100 including at least one computing system (e.g., see computing system 102), a communication network 104, head orientation training devices, e.g., see head orientation training devices 106, 107, and 108, and client devices, e.g., see client devices 110, 111, and 112. As shown, a HOTD of the network 100 can include a computing system (e.g., see computing systems 116, 117, and 118). Also, as shown, a client device of the network can include a computing system (e.g., see computing systems 120, 121, and 122). The computing system 102 is a computing system external to the head orientation training devices and the client devices of the network 100.

Any computing system of the network 100 can be configured to communicate with any other computing system of the network through one or more communication networks (e.g., see communication network 104). In the case of the communication network 104 including the Internet, the devices of the network 100 can be considered Internet of Things (IoT) devices.

The communication network 104 can include one or more local area networks (LAN(s)) and/or one or more wide area networks (WAN(s)). The communication network 104 can include the Internet and/or any other type of interconnected communications network. The communication network 104 can also include a single computer network or a telecommunications network. More specifically, the communication network 104 can include a local area network (LAN) such as a private computer network that connects computers in small physical areas, a wide area network (WAN) to connect computers located in different geographical locations, and/or a middle area network (MAN) to connect computers in a geographic area larger than that covered by a large LAN but smaller than the area covered by a WAN.

As shown, at least each shown component of the network 100 (including computing system 102, communication network 104, head orientation training devices 106, 107, and 108, and client devices 110, 111, and 112) can be or include a computing system which can include memory that can include media. The media can include or be volatile memory components, non-volatile memory components, or a combination of thereof. In general, each of the computing systems can include a host system that uses memory. For example, the host system can write data to the memory and read data from the memory. The host system can be a computing device that includes a memory and a data processing device. The host system can include or be coupled to the memory so that the host system can read data from or write data to the memory. The host system can be coupled to the memory via a physical host interface. The physical host interface can provide an interface for passing control, address, data, and other signals between the memory and the host system.

Figure 2:
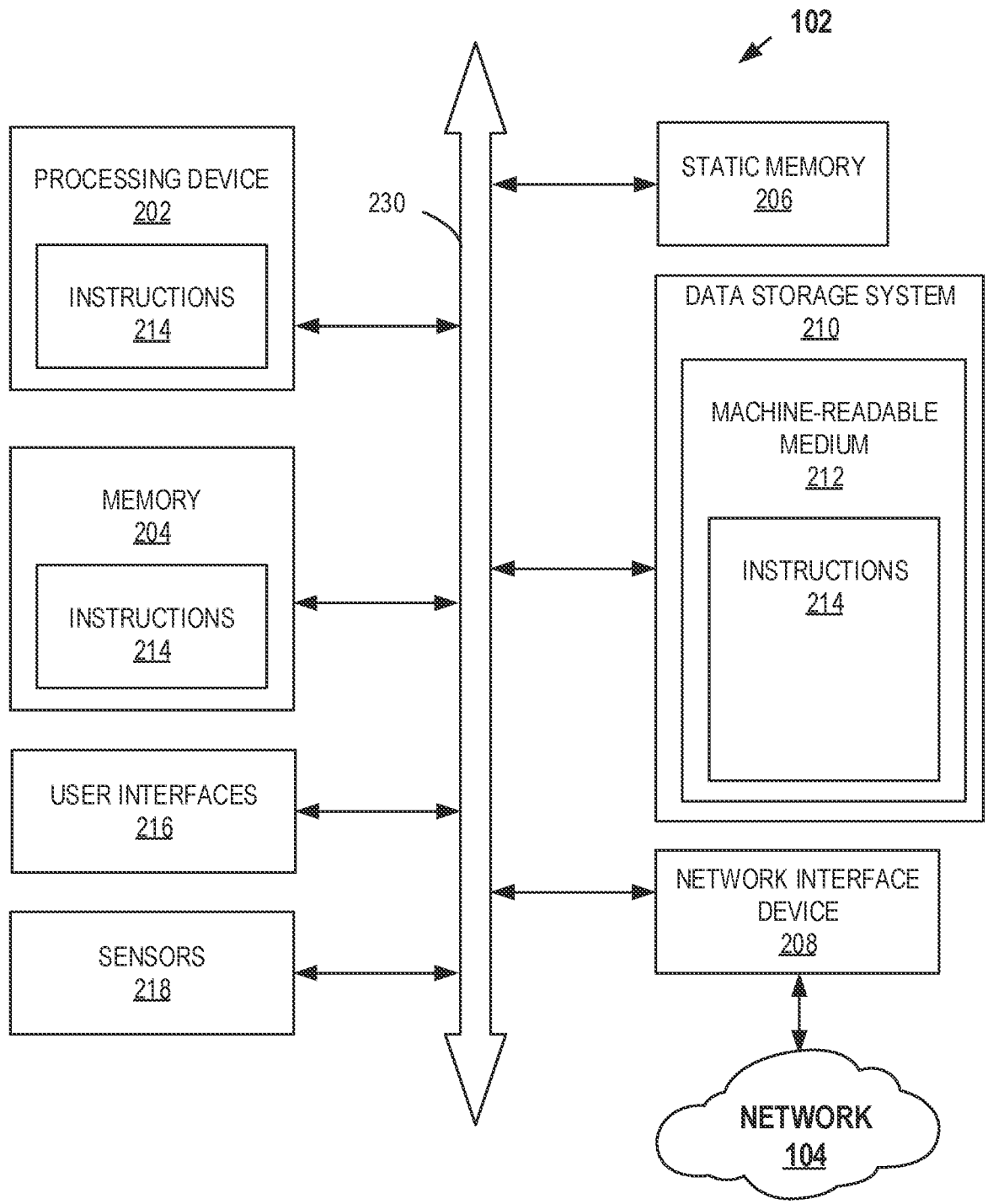
FIG. 2 illustrates a block diagram of example aspects of a computing system external to a head orientation training device (HOTD), in accordance with some embodiments of the present disclosure.

FIG. 2 shows a block diagram of example aspects of the computing system 102. Not depicted, the example aspects of the computing system 102 can be example aspects of a computing system of one of the client devices shown in FIG. 1 (e.g., see computing systems 120, 121, and 122). FIG. 2 illustrates parts of the computing system 102 within which a set of instructions, for causing the machine to perform any one or more of the methodologies discussed herein, can be executed. In some embodiments, the computing system 102 can correspond to a host system that includes, is coupled to, or utilizes memory or can be used to perform the operations performed by any one of the computing devices, data processors, user interface devices, and sensors described herein. In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment. The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computing system 102 includes a processing device 202, a main memory 204 (e.g., read-only memory (ROM), flash memory, dynamic random-access memory (DRAM), etc.), a static memory 206 (e.g., flash memory, static random-access memory (SRAM), etc.), and a data storage system 210, which communicate with each other via a bus 230.

The processing device 202 represents one or more general-purpose processing devices such as a microprocessor, a central processing unit, or the like. More particularly, the processing device can be a microprocessor or a processor implementing other instruction sets, or processors implementing a combination of instruction sets. The processing device 202 can also be one or more special-purpose processing devices such as an application specific integrated circuit (ASIC), a field programmable gate array (FPGA), a digital signal processor (DSP), network processor, or the like. The processing device 202 is configured to execute instructions 214 for performing the operations discussed herein. The computing system 102 can further include a network interface device 208 to communicate over the communication network 104 shown in FIG. 1.

The data storage system 210 can include a machine-readable storage medium 212 (also known as a computer-readable medium) on which is stored one or more sets of instructions 214 or software embodying any one or more of the methodologies or functions described herein. The instructions 214 can also reside, completely or at least partially, within the main memory 204 and/or within the processing device 202 during execution thereof by the computing system 102, the main memory 204 and the processing device 202 also constituting machine-readable storage media.

In some embodiments, the instructions 214 include instructions to implement functionality corresponding to any one of the computing devices, data processors, user interface devices, I/O devices, and sensors described herein. While the machine-readable storage medium 212 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Also, as shown, computing system 102 includes user interfaces 216 that can include a display and implement functionality corresponding to any one of the user interface devices disclosed herein. Also, as shown, computing system 102 includes sensors 218 that can include any known type of sensor used with a computing device and that implement functionality corresponding to any one of the sensors disclosed herein or other types of known sensors.

A user interface, such as one of the user interfaces 216, or a user interface device described herein can include any space or equipment where interactions between humans and machines occur. A user interface described herein can allow operation and control of the machine from a human user, while the machine can simultaneously provide feedback information to the user. Examples of a user interface (UI), or user interface device include the interactive aspects of computer operating systems (such as graphical user interfaces), machinery operator controls, and process controls. A UI described herein can include one or more layers, including a human-machine interface (HMI) that interfaces machines with physical input hardware such as keyboards, mice, or pads, and output hardware such as monitors, speakers, and printers. Such a UI can also include a device that implements an HMI—also known as a human interface device (HID). Additional UI layers can be included in UI described herein including tactile UI (touch), visual UI (sight), auditory UI (sound), olfactory UI (smell), and gustatory UI (taste). Such a UI can also include composite user interfaces (CUIs), which are UIs that interact with two or more human senses. In some embodiments, a graphical user interface (GUI), which is composed of a tactile UI and a visual UI capable of displaying graphics, or any other type of UI can present information related to head orientation training (such as head orientation training for sports) to a user of the system. Sound can also be added to a GUI, such that the UI is a multimedia user interface (MUI) can provide information related to head orientation training to the user via visual and audio means. UI described herein can also include virtual reality or augmented reality aspects.

Figure 3:
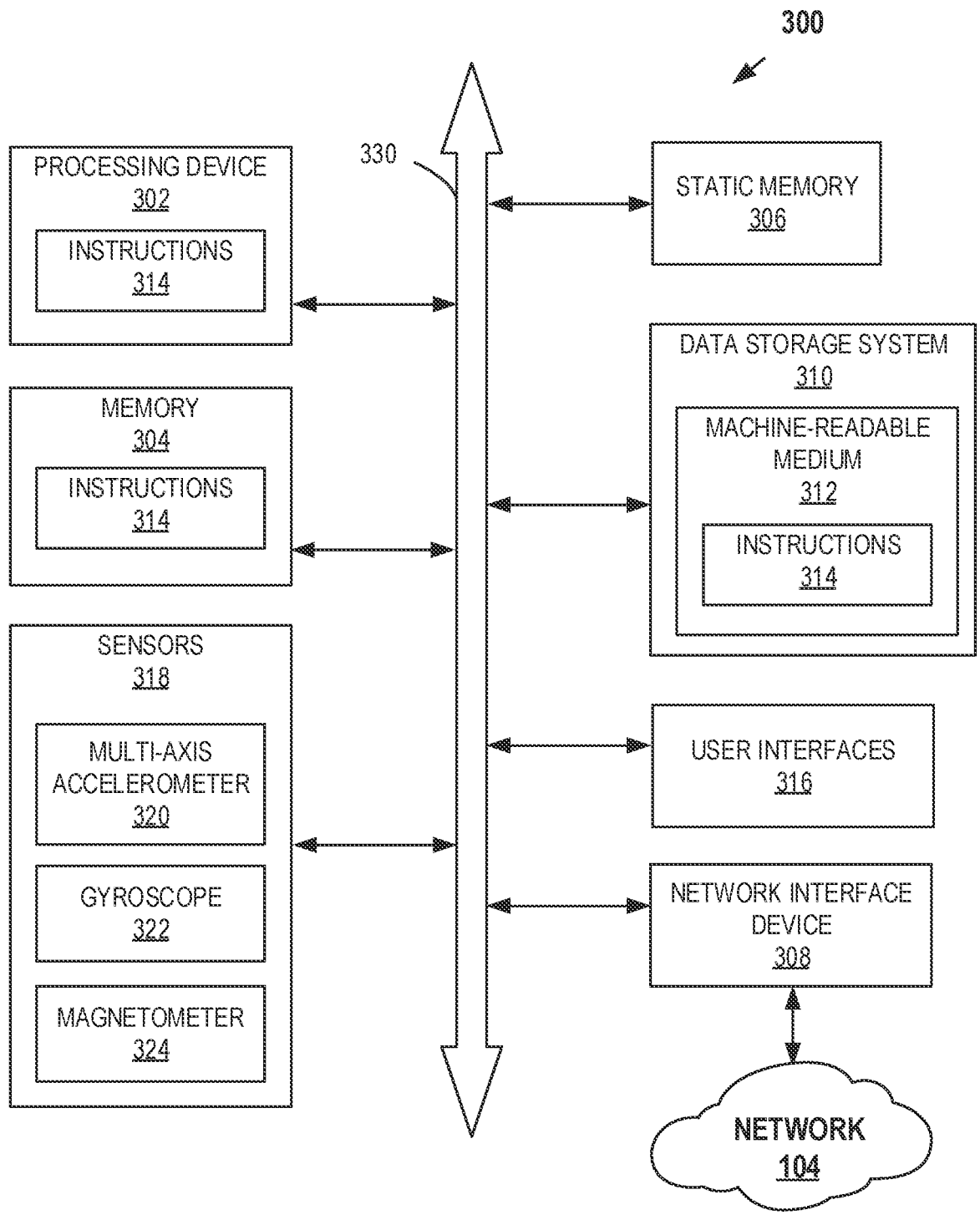
FIG. 3 illustrates a block diagram of example aspects of a computing system of a HOTD, in accordance with some embodiments of the present disclosure. The computing system illustrated in FIG. 3 is shown having a multi-axis accelerometer, a gyroscope, and a magnetometer. However, it is to be understood that in some embodiments, a computing system of a HOTD can include a multi-axis accelerometer, a gyroscope, or a magnetometer, or any combination thereof.

FIG. 3 illustrates a block diagram of example aspects of a computing system 300 of a HOTD (e.g., see computing systems 116, 117, and 118). The computing system 300 is shown having sensors 318 that include a multi-axis accelerometer 320, a gyroscope 322, and a magnetometer 324. However, it is to be understood that in some embodiments, a computing system of a HOTD can include a multi-axis accelerometer, a gyroscope, or a magnetometer, or any combination thereof. Not depicted, in some embodiments, the example aspects of the computing system 300 can be example aspects of a computing system of one of the client devices shown in FIG. 1 (e.g., see computing systems 120, 121, and 122). FIG. 3 illustrates parts of the computing system 300 within which a set of instructions, for causing the machine to perform any one or more of the methodologies discussed herein, can be executed. In some embodiments, the computing system 300 can correspond to a host system that includes, is coupled to, or utilizes memory or can be used to perform the operations performed by any one of the computing devices, data processors, user interface devices, and sensors described herein. In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment. The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computing system 300 includes a processing device 302, a main memory 304 (e.g., read-only memory (ROM), flash memory, dynamic random-access memory (DRAM), etc.), a static memory 306 (e.g., flash memory, static random-access memory (SRAM), etc.), and a data storage system 310, which communicate with each other via a bus 330.

The processing device 302 represents one or more general-purpose processing devices such as a microprocessor, a central processing unit, or the like. More particularly, the processing device can be a microprocessor or a processor implementing other instruction sets, or processors implementing a combination of instruction sets. The processing device 302 can also be one or more special-purpose processing devices such as an application specific integrated circuit (ASIC), a field programmable gate array (FPGA), a digital signal processor (DSP), network processor, or the like. The processing device 302 is configured to execute instructions 314 for performing the operations discussed herein. The computing system 300 can further include a network interface device 308 to communicate over the communication network 104 shown in FIG. 1.

The data storage system 310 can include a machine-readable storage medium 312 (also known as a computer-readable medium) on which is stored one or more sets of instructions 314 or software embodying any one or more of the methodologies or functions described herein. The instructions 314 can also reside, completely or at least partially, within the main memory 304 and/or within the processing device 302 during execution thereof by the computing system 300, the main memory 304 and the processing device 302 also constituting machine-readable storage media.

In some embodiments, the instructions 314 include instructions to implement functionality corresponding to any one of the computing devices, data processors, user interface devices, I/O devices, and sensors described herein. While the machine-readable storage medium 312 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Also, as shown, computing system 300 includes user interfaces 316 that can include a display or one or more LEDs and implement functionality corresponding to any one of the user interface devices or LEDs disclosed herein. Also, as shown, computing system 300 includes sensors 318 that can include any known type of sensor used with a computing device and that implement functionality corresponding to any one of the sensors disclosed herein or other types of known sensors. Specifically, the sensors 318 are shown including multi-axis accelerometer 320, gyroscope 322, and magnetometer 324.

A user interface, such as one of user interfaces 316, or a user interface device described herein can include any space or equipment where interactions between humans and machines occur. A user interface described herein can allow operation and control of the machine from a human user, while the machine can simultaneously provide feedback information to the user. Examples of a user interface (UI), or user interface device include the interactive aspects of computer operating systems (such as graphical user interfaces), machinery operator controls, and process controls. A UI described herein can include one or more layers, including a human-machine interface (HMI) that interfaces machines with physical input hardware such as keyboards, mice, or pads, and output hardware such as monitors, speakers, and printers. Such a UI can also include a device that implements an HMI—also known as a human interface device (HID). Additional UI layers can be included in UI described herein including tactile UI (touch), visual UI (sight), auditory UI (sound), olfactory UI (smell), and gustatory UI (taste). Such a UI can also include composite user interfaces (CUIs), which are UIs that interact with two or more human senses. In some embodiments, a graphical user interface (GUI), which is composed of a tactile UI and a visual UI capable of displaying graphics, or any other type of UI can present information related to head orientation training (such as head orientation training for sports) to a user of the system. Sound can also be added to a GUI, such that the UI is a multimedia user interface (MUI) can provide information related to head orientation training to the user via visual and audio means. UI described herein can also include virtual reality or augmented reality aspects.

Figure 4:
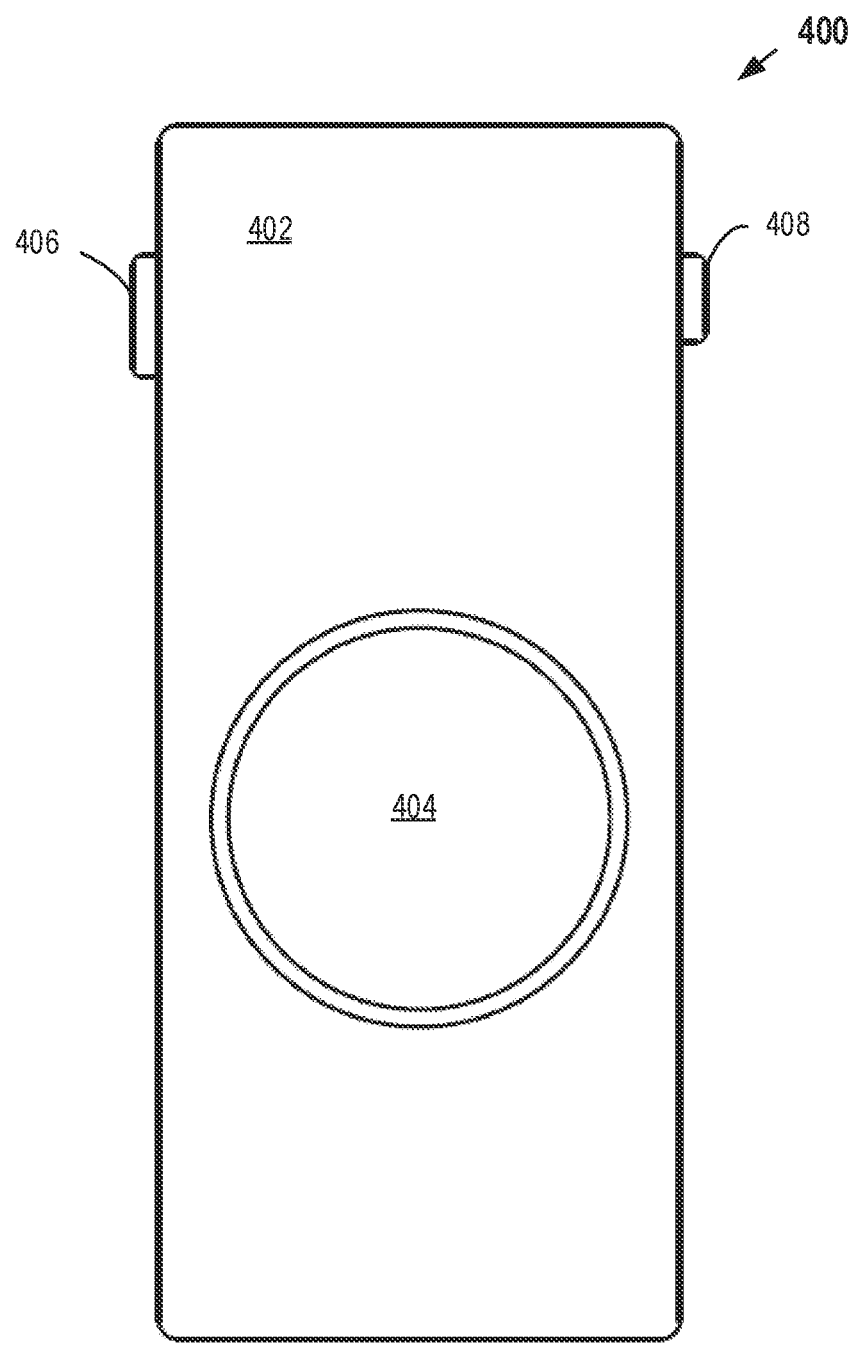
FIG. 4 illustrates a schematic front view of a HOTD, such as one of the head orientation training devices shown in FIG. 1, in accordance with some embodiments of the present disclosure.
Figure 5:
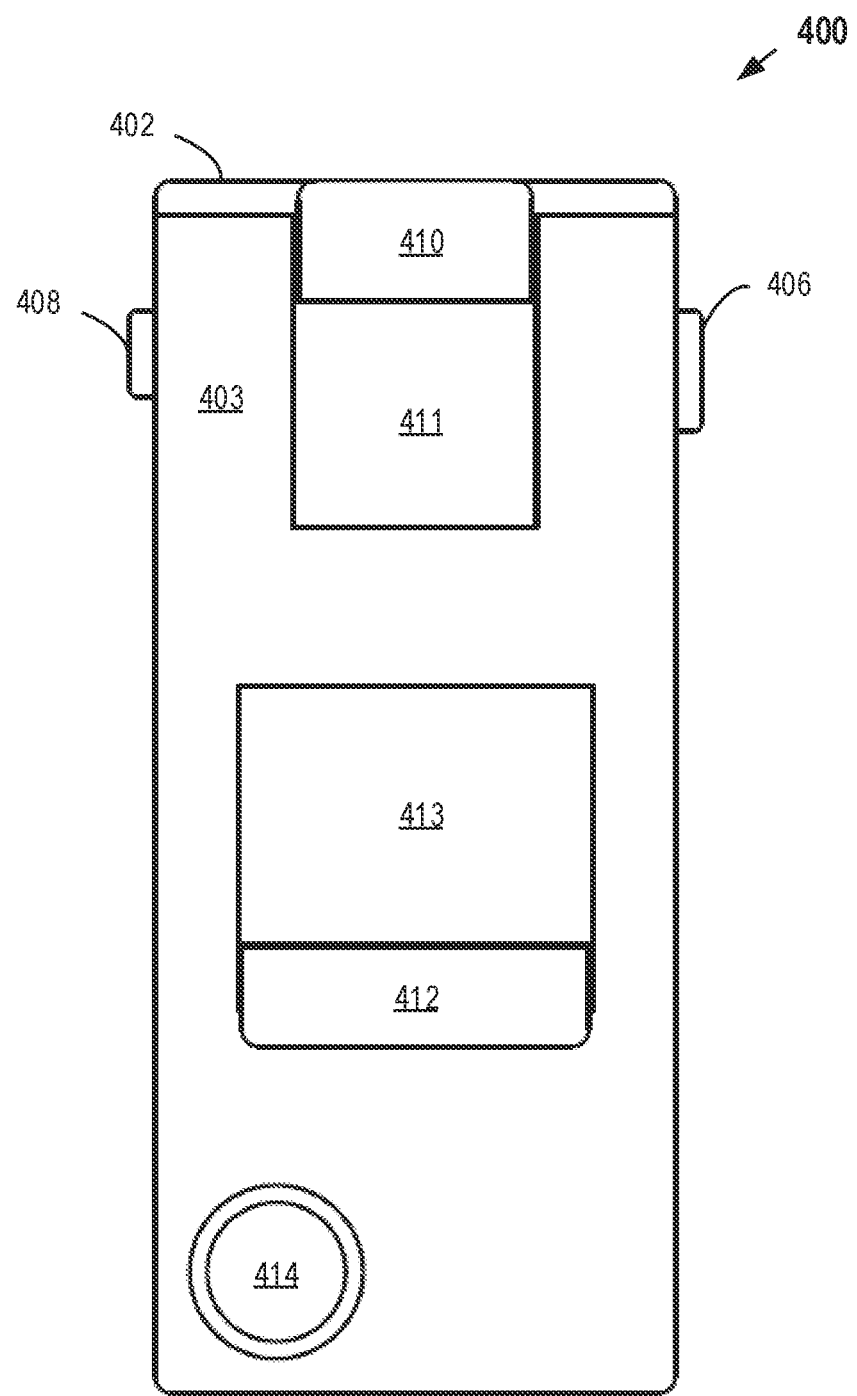
FIG. 5 illustrates a schematic back view of the HOTD shown in FIG. 4, in accordance with some embodiments of the present disclosure.
Figure 6:
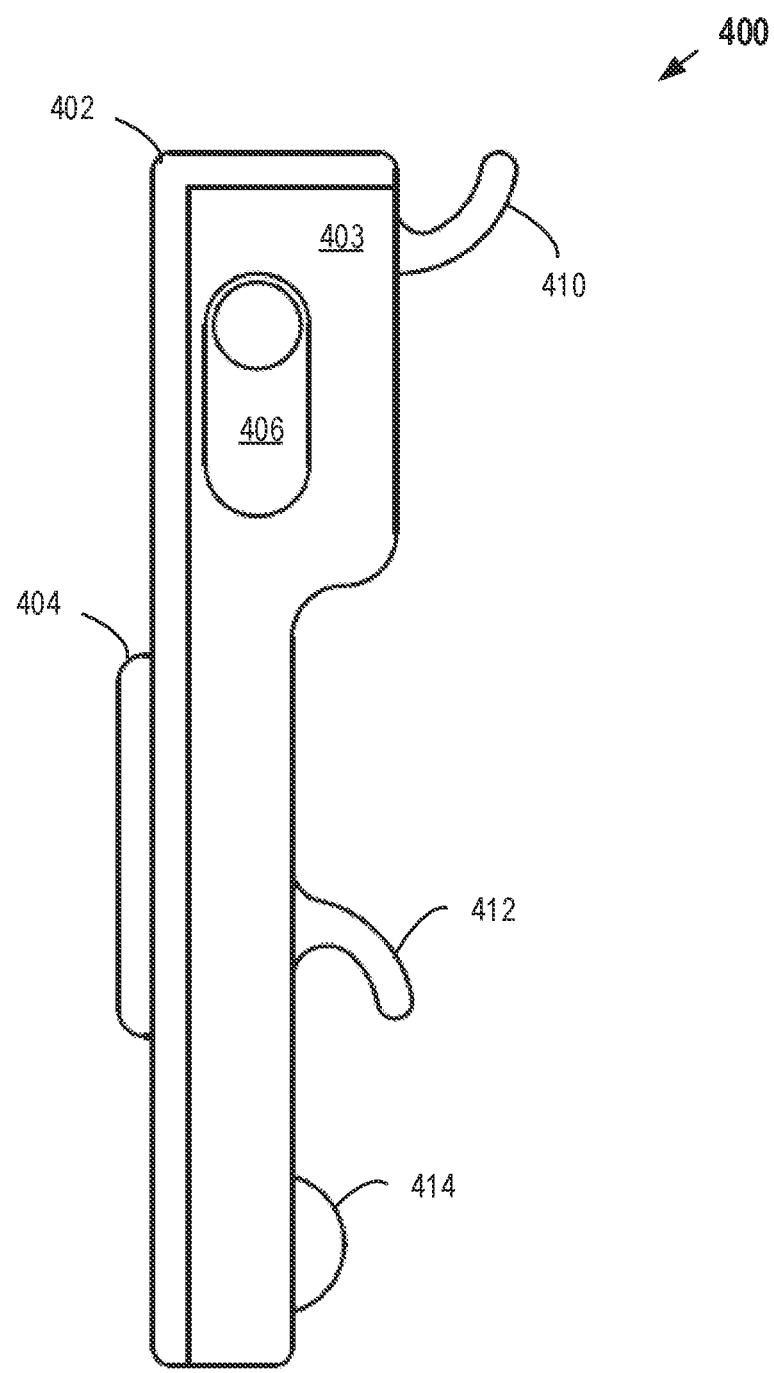
FIGS. 6 and 7 illustrate opposing schematic side views of the HOTD shown in FIG. 4, in accordance with some embodiments of the present disclosure.
Figure 7:
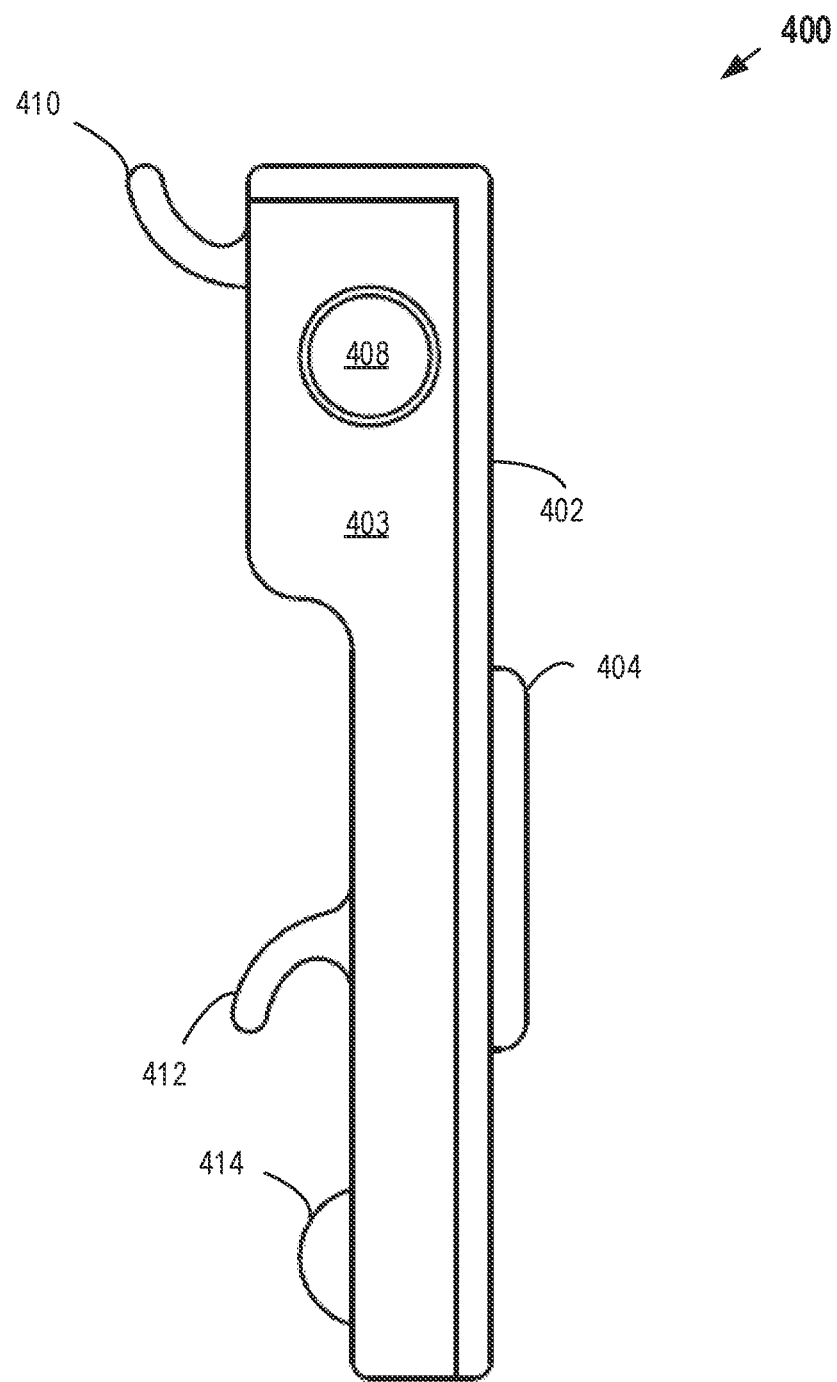
Figure 8:
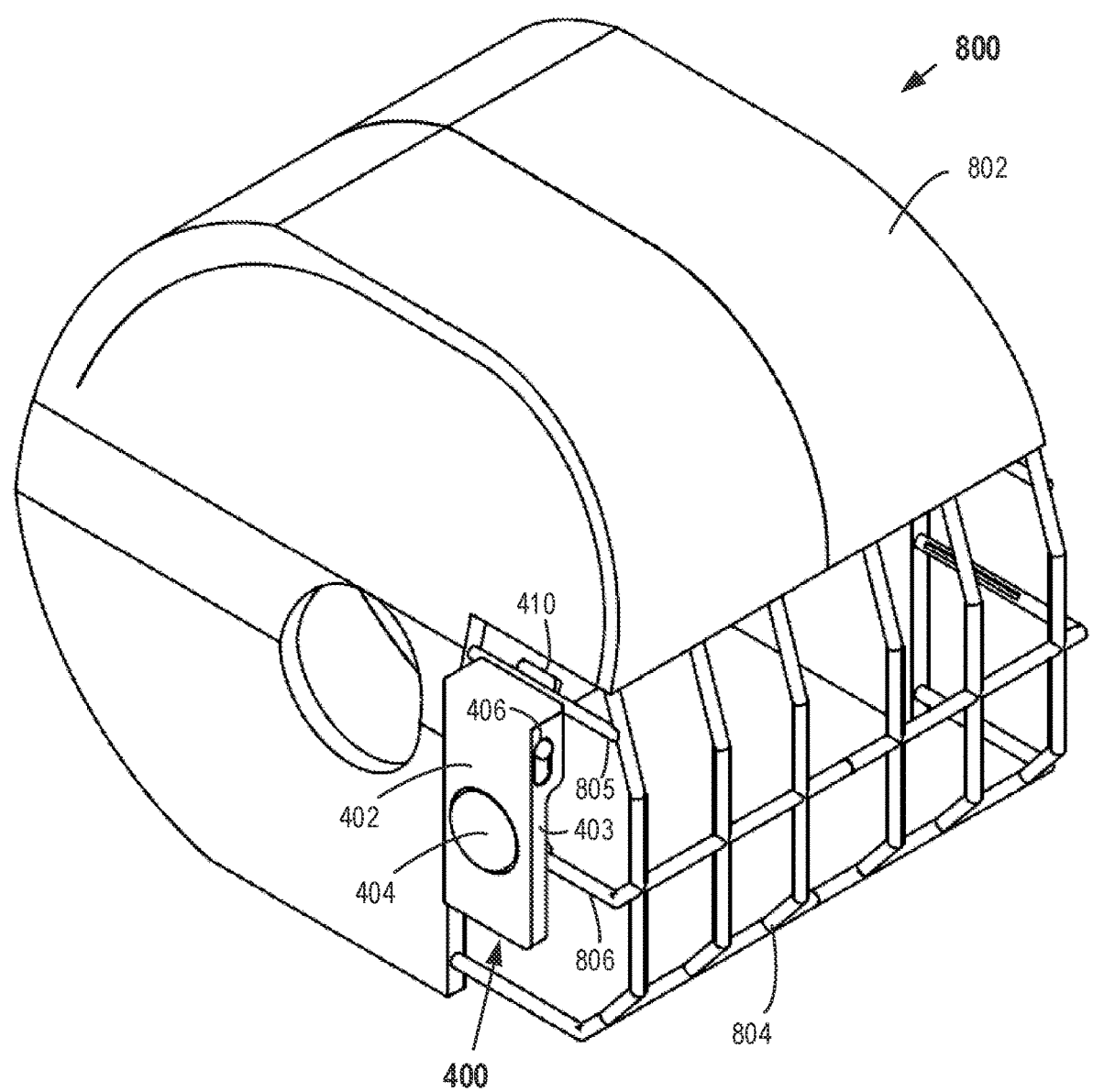
FIGS. 8 and 9 illustrate different perspective views of the HOTD shown in FIG. 4 and the device being attached to a sports helmet, in accordance with some embodiments of the present disclosure.
Figure 9:
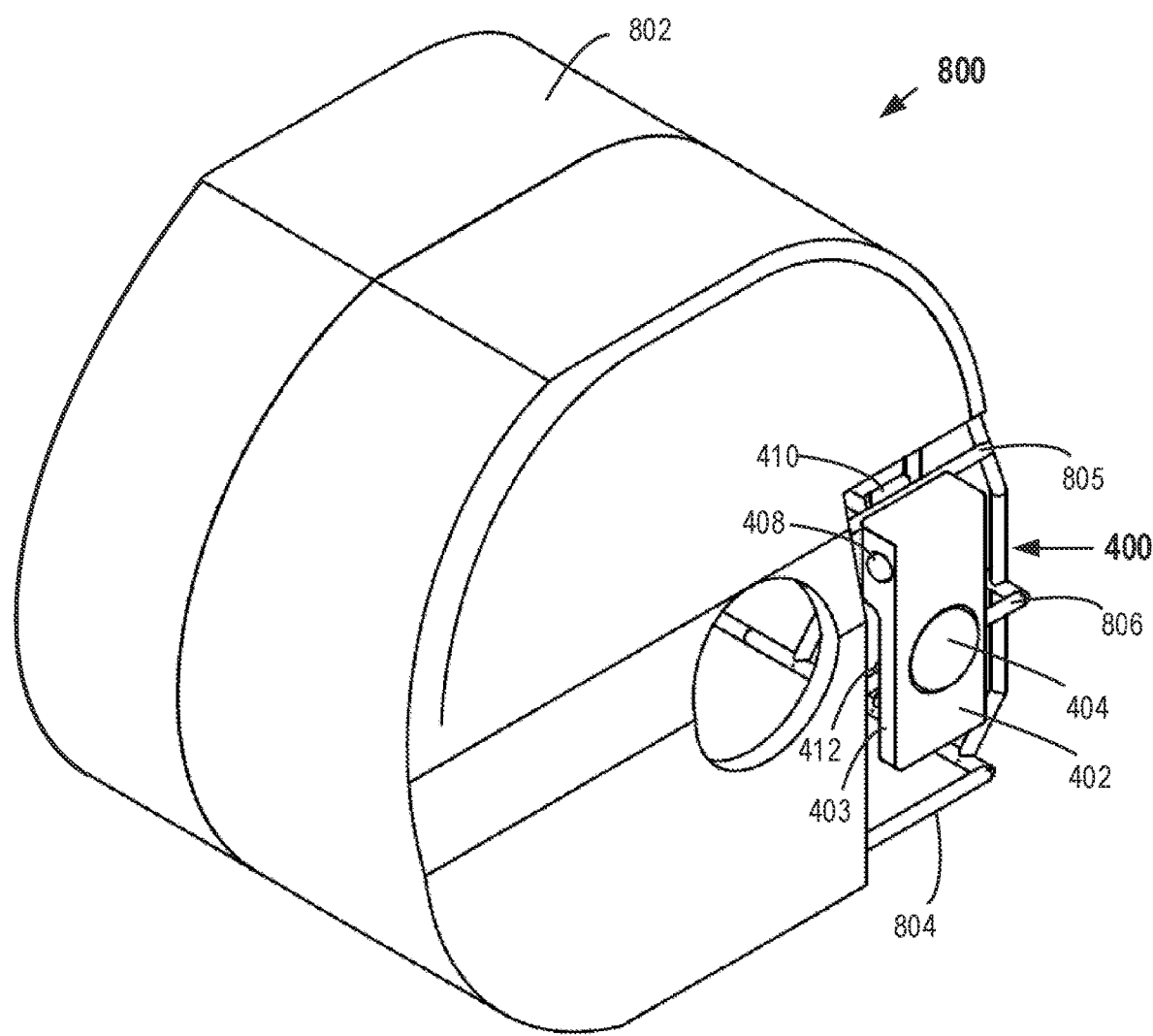

FIG. 4 illustrates a schematic front view of a HOTD 400, such as one of the head orientation training devices shown in FIG. 1 (e.g., see head orientation training devices 106, 107, and 108). FIG. 5 illustrates a schematic back view of the HOTD 400. FIGS. 6 and 7 illustrate opposing schematic side views of the HOTD 400. FIGS. 8 and 9 illustrate different perspective views of the HOTD 400 and the device being attached to a sports helmet 800.

As shown, the HOTD 400 includes a front-side housing part 402, a back-side housing part 403, a front-side button 404, a power button 406 (which is shown as being a power switch), and an additional side button 408. In some embodiments, the front-side button 404 can be configured to receive a user input to notify the HOTD 400 to configure a tilt threshold or a time threshold. In some embodiments, additional side button 408 can be configured to receive a user input to notify the HOTD 400 to configure a tilt threshold or a time threshold. The HOTD 400 also includes a clip 410 and a clip base 411 that is attached to the back-side housing part 403.

The HOTD 400 also includes a clip 412 and a clip base 413 that is attached to the back-side housing part 403. The clips 410 and 412 are position opposing each other such that, in combination, the clips can secure the HOTD 400 to two different bars of a face mask of a sports helmet (e.g., see bars 805 and 806 of face mask 804 of sports helmet 800).

Also shown, the HOTD 400 includes a back-side light 414. The back-side light 414 can include an LED and can be configured to emit light to notify the player wearing the HOTD 400 that a tilt threshold has been exceeded.

Figure 10:
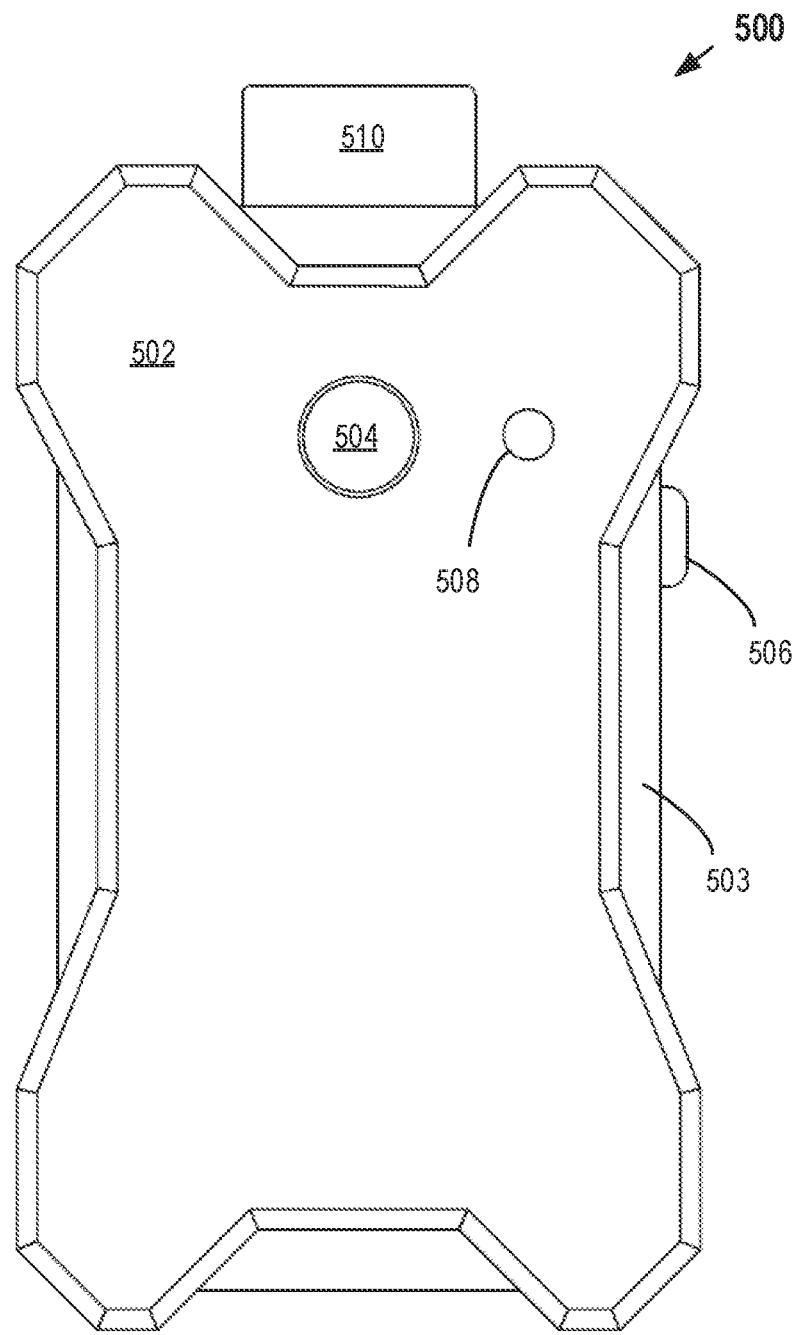
FIG. 10 illustrates a schematic front view of another HOTD, such as one of the head orientation training devices shown in FIG. 1, in accordance with some embodiments of the present disclosure.
Figure 11:
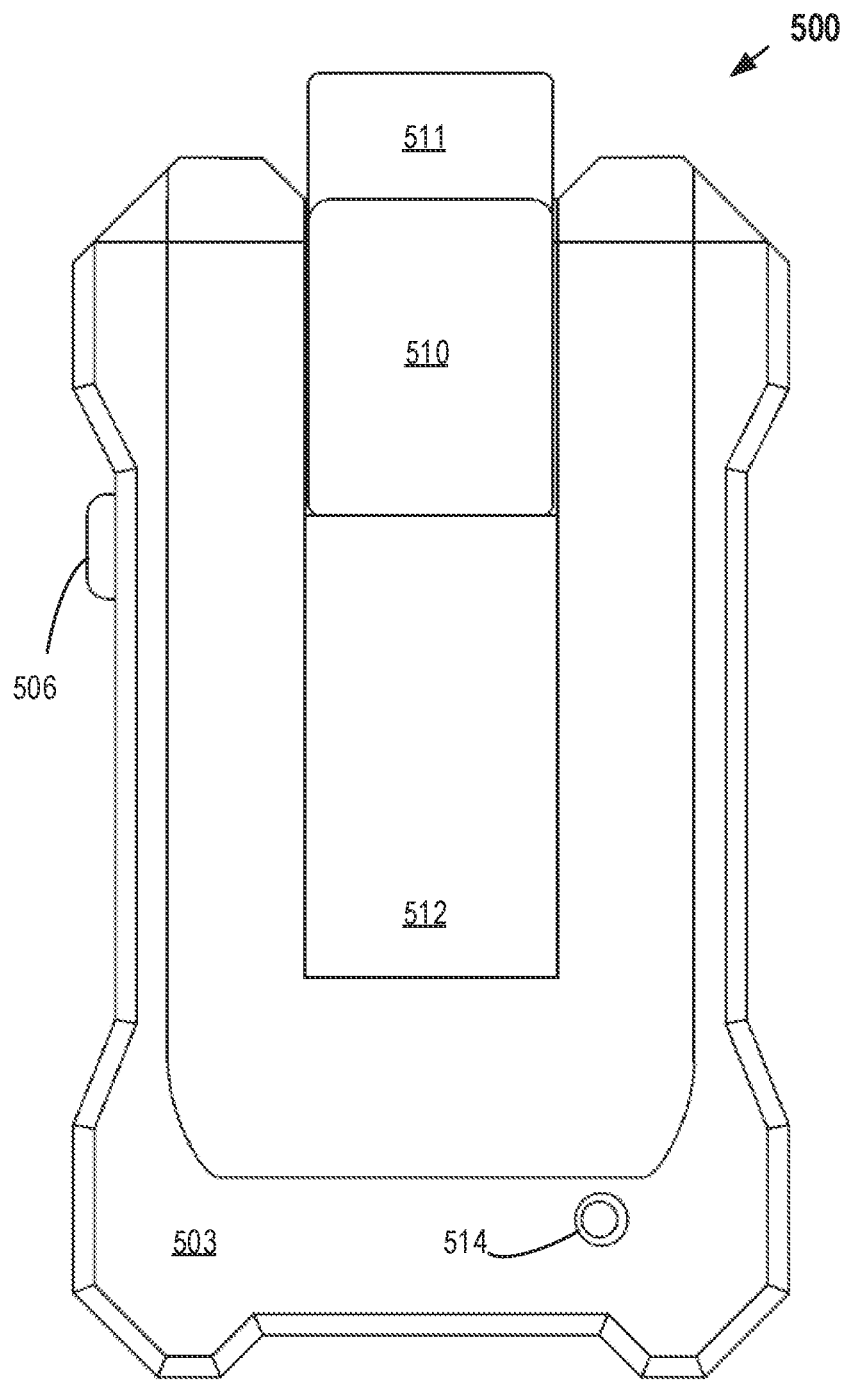
FIG. 11 illustrates a schematic back view of the HOTD shown in FIG. 10, in accordance with some embodiments of the present disclosure.
Figure 12:
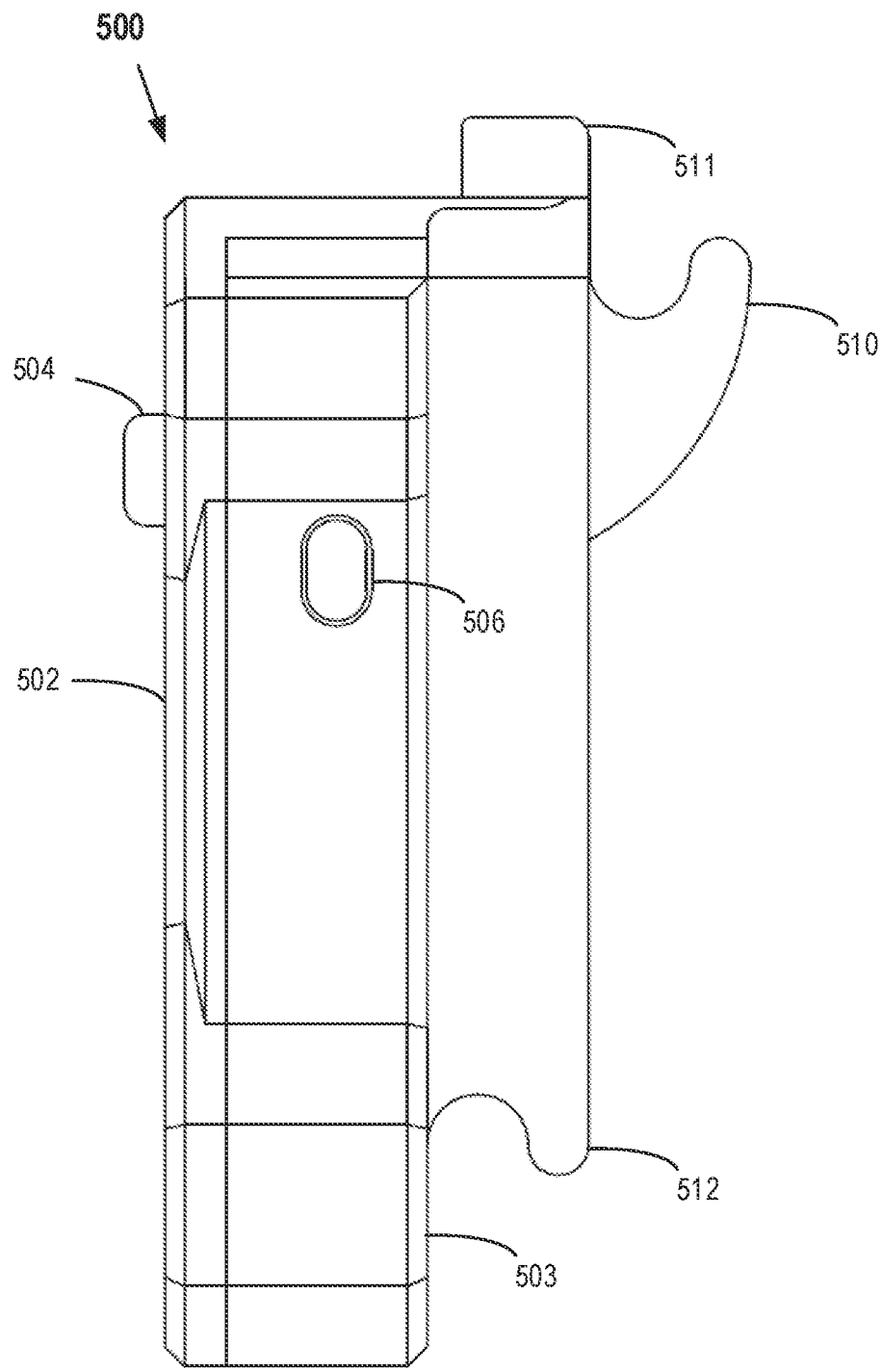
FIG. 12 illustrates a schematic side view of the HOTD shown in FIG. 10, in accordance with some embodiments of the present disclosure.
Figure 13:
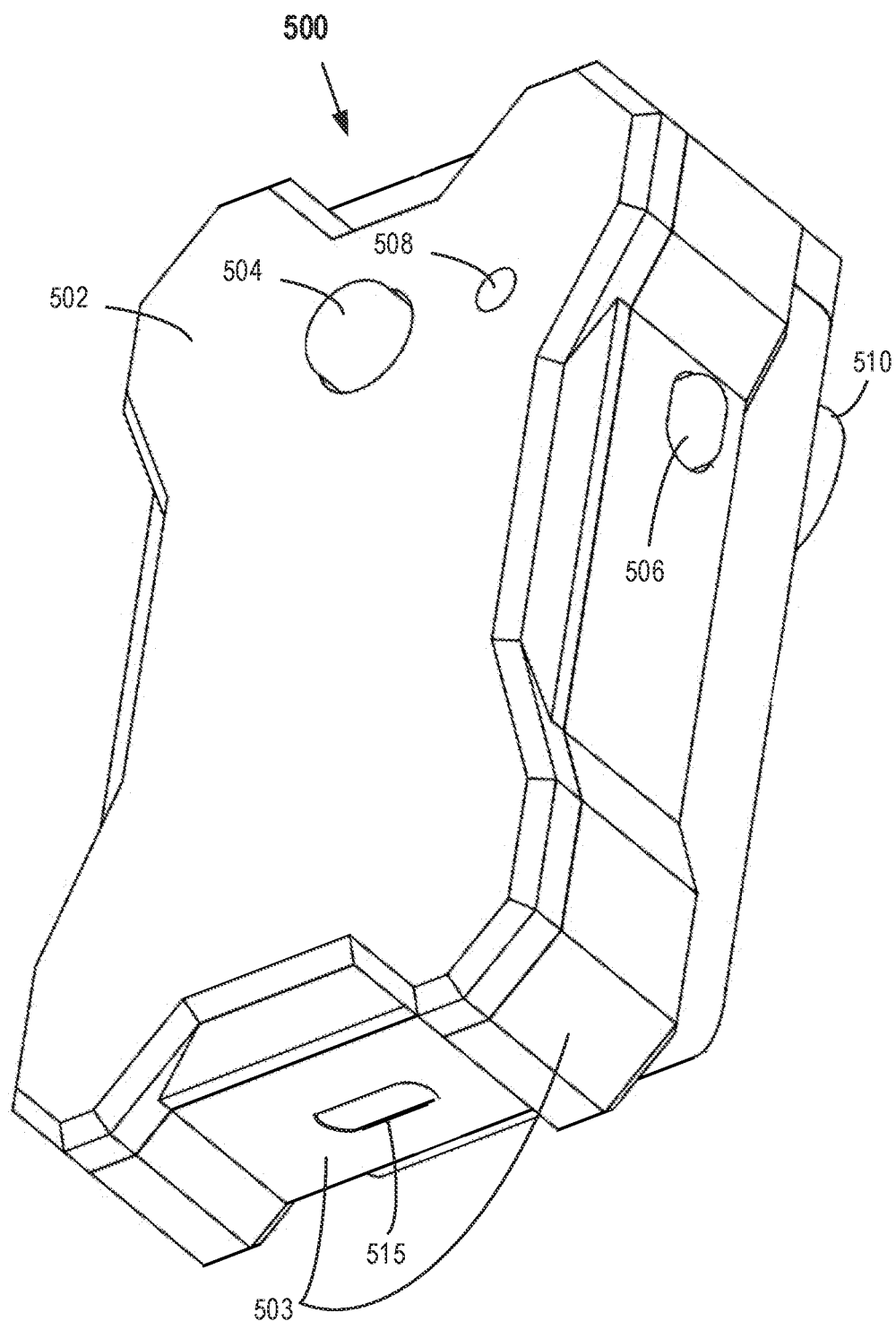
FIG. 13 illustrates a schematic perspective view of the HOTD shown in FIG. 10, in accordance with some embodiments of the present disclosure.
Figure 14:
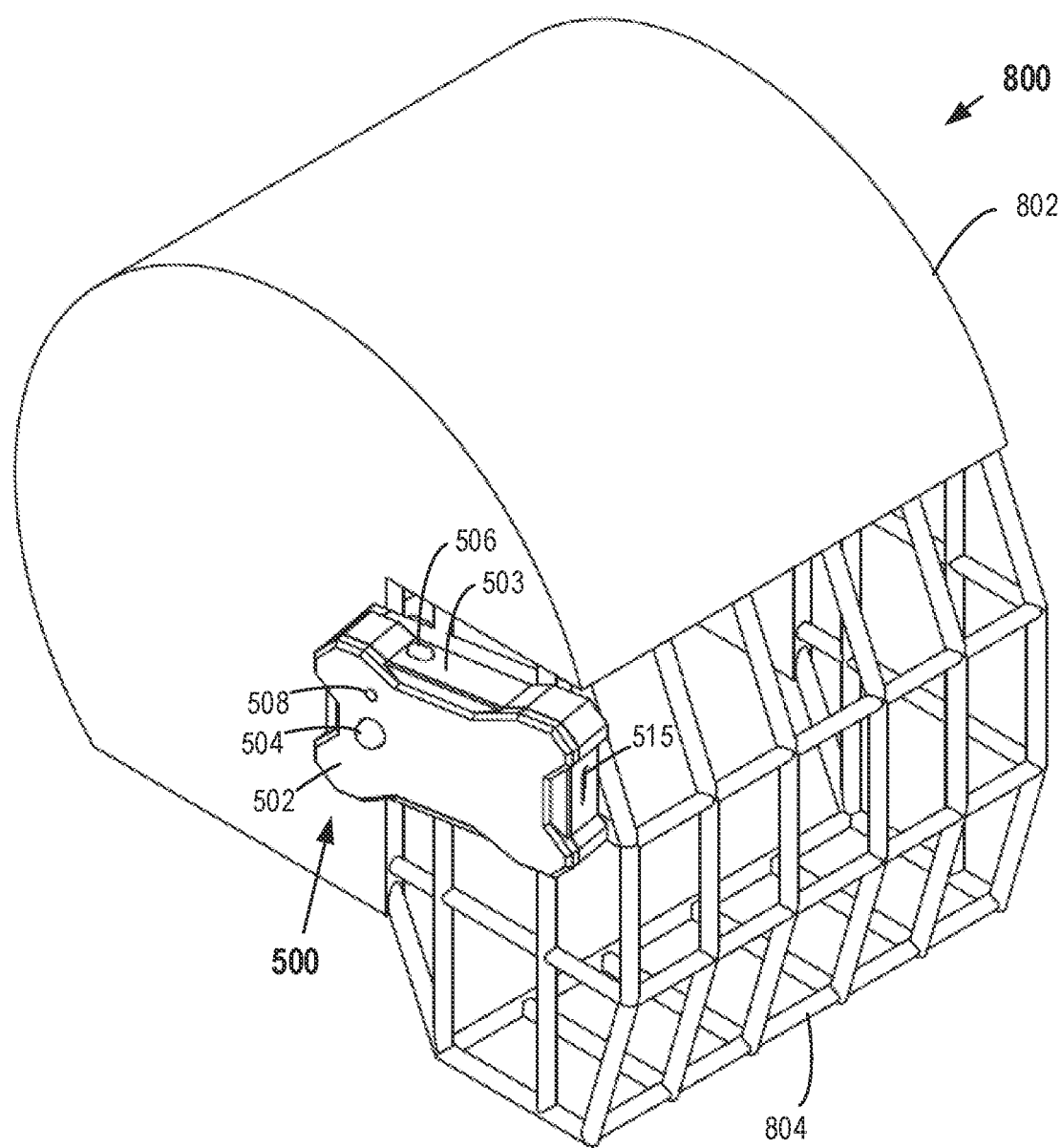
FIG. 14 illustrates a perspective view of the HOTD shown in FIG. 10 and the device being attached to a sports helmet, in accordance with some embodiments of the present disclosure.
Figure 15:
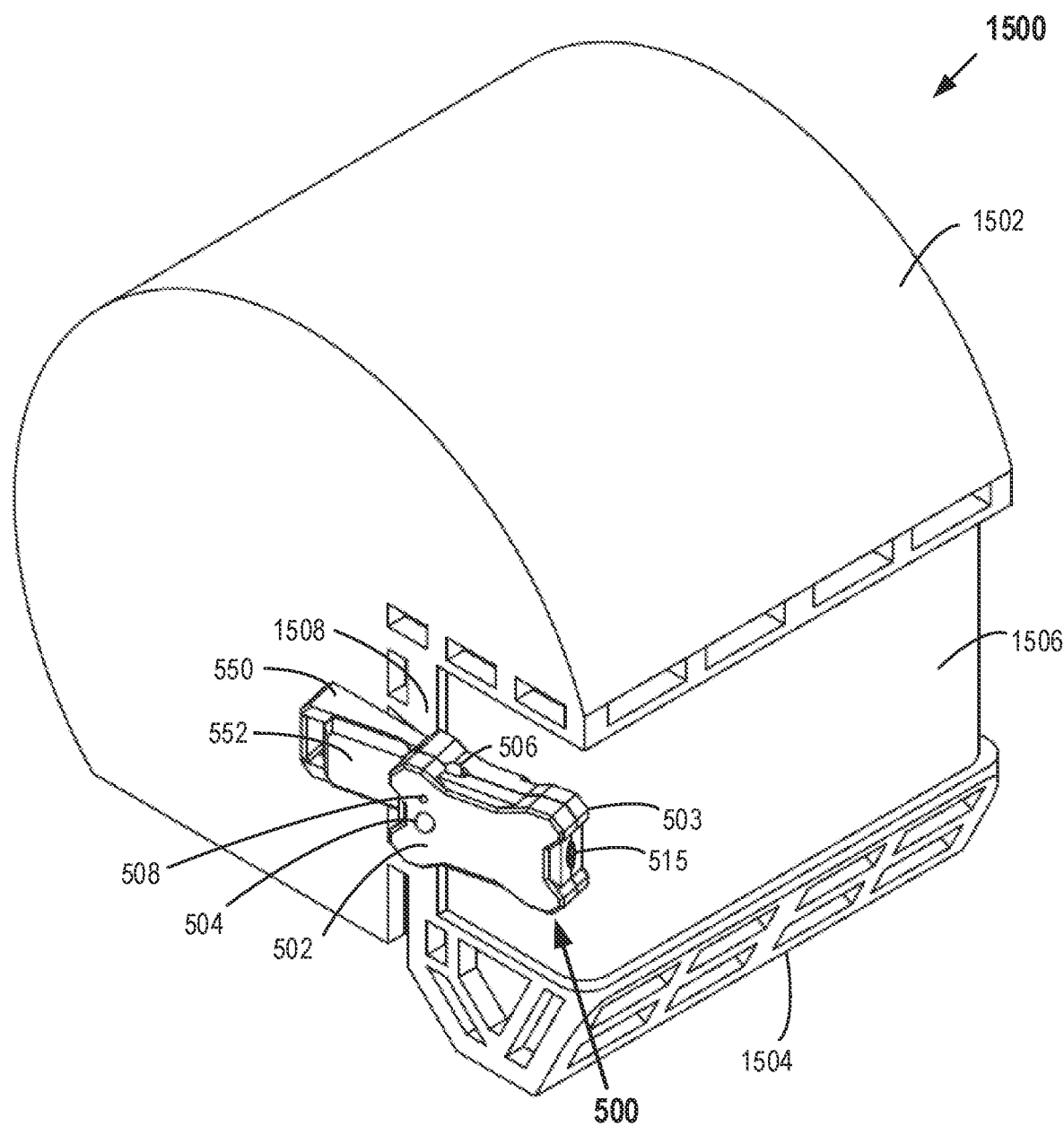
FIG. 15 illustrates a perspective view of the HOTD shown in FIG. 10 having an adapter configured to attach the device to a sports helmet having a face shield as well as the device being attached to the sports helmet, in accordance with some embodiments of the present disclosure.

FIG. 10 illustrates a schematic front view of another HOTD 500, such as one of the head orientation training devices shown in FIG. 1 (e.g., see head orientation training devices 106, 107, and 108). FIG. 11 illustrates a schematic back view of the HOTD 500. FIG. 12 illustrates a schematic side view of the HOTD 500. FIG. 13 illustrates a schematic perspective view of the HOTD 500. FIG. 14 illustrates a perspective view of the HOTD 500 and the HOTD 500 being attached to sports helmet 800. FIG. 15 illustrates a perspective view of the HOTD 500 having an adapter 550 configured to attach the HOTD 500 to a sports helmet 1500 having a face shield 1506 as well as the HOTD 500 being attached to the sports helmet 1500.

As shown, the HOTD 500 includes a front-side housing part 502, a back-side housing part 503, a front-side button 504, a power button 506, and a front-side light 508. In some embodiments, the front-side button 504 can be configured to receive a user input to notify the HOTD 500 to configure a tilt threshold or a time threshold. The front-side light 508 can include an LED and can be configured to emit light to notify a person other than the player wearing the HOTD 500 that a tilt threshold has been exceeded. Also, the front-side light 508 can include an LED and can be configured to emit light to notify a user of the device that a tilt threshold has been exceeded.

The HOTD 500 also includes a clip 510 and a clip base 511 that is attached to the back-side housing part 503. The HOTD 500 also includes a clip 512 that is attached to the back-side housing part 503. The clips 510 and 512 are position opposing each other such that, in combination, the clips can secure the HOTD 500 to two different bars of a face mask of a sports helmet.

Also shown, the HOTD 500 includes a back-side light 514. The back-side light 514 can include an LED and can be configured to emit light to notify the player wearing the HOTD 500 that a tilt threshold has been exceeded.

Also shown, the HOTD 500 includes a charging port 515 configured to receive a connector of a charging interface such as a USB power cord. The charging port 515 can be connected to a power supply or battery of the HOTD 500 so that a power source can recharge the power supply or battery of the HOTD 500.

As mentioned, FIG. 15 illustrates a perspective view of the HOTD 500 having an adapter 550 configured to attach the HOTD 500 to a sports helmet 1500 having a face shield 1506. Also shown, the HOTD 500 is attached to the adapter 550 via an adapter interface part 552. As shown, the helmet 1500 includes a portion 1502 that is worn on the head of a player. Similarly, the helmet 800 includes a portion 802 that is worn on the head of player. The helmet 1500 also includes a facemask 1504 that includes face shield 1506 and bars (e.g., see bar 1508). The bars are a part of a grate that surrounds the face shield 1506. Since the HOTD 500 cannot attach to bars similar to bars of the helmet 800 when attaching to helmet 1500, the adapter 550 is configured to attached to a bar near the face shield 1506 (e.g., see bar 1508), so that the HOTD 500 can be arranged on the helmet so that the wearer of the helmet can see the back-side light 514.

Figure 16A:
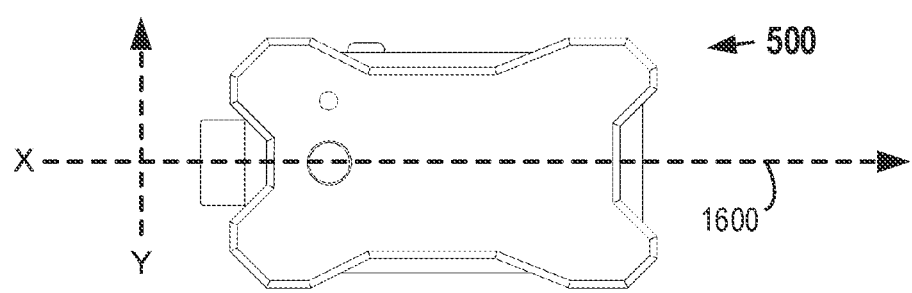
FIGS. 16A, 16B, and 16C illustrate a HOTD having no tilt, a first amount of tilt, and a second amount of tilt, respectively, in accordance with some embodiments of the present disclosure.
Figure 16B:
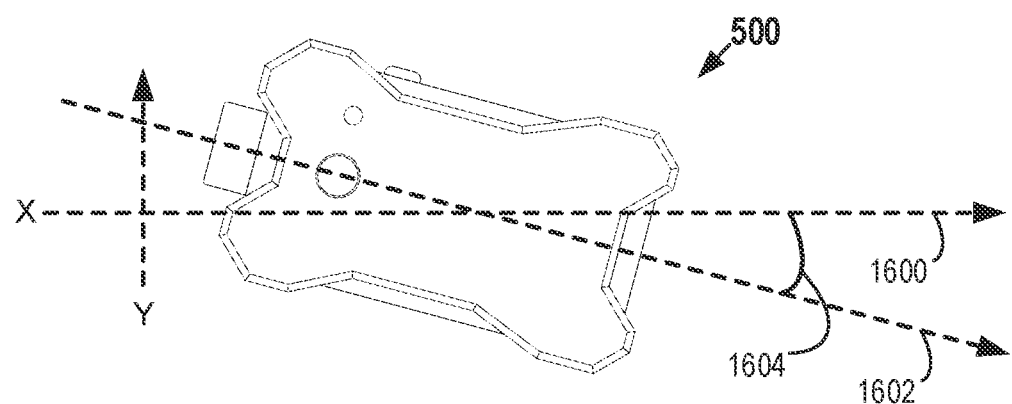
Figure 16C:
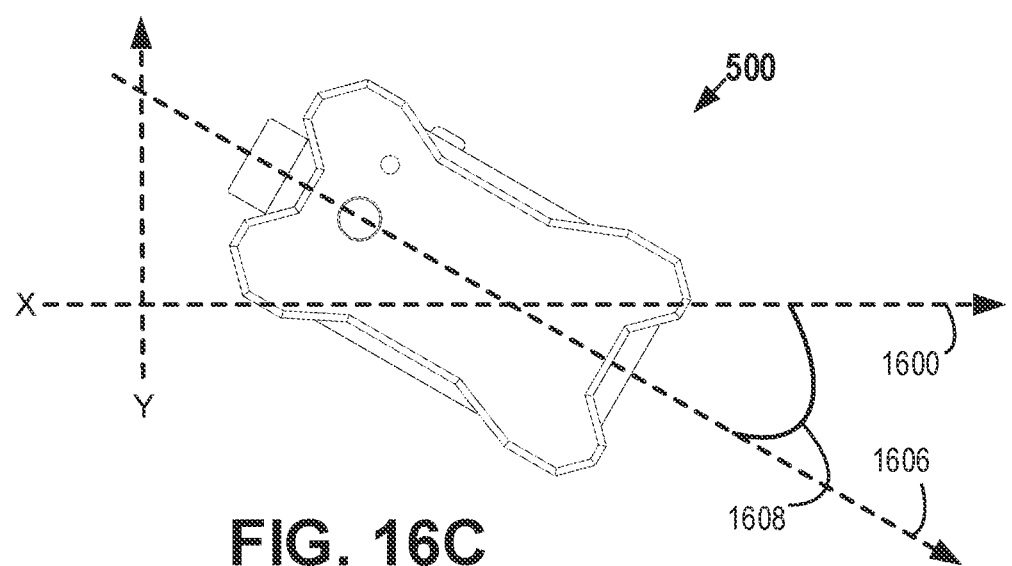

FIGS. 16A, 16B, and 16C illustrate a HOTD 500 having no tilt, a first amount of tilt 1604, and a second amount of tilt 1608, respectively. When the HOTD 500 has no tilt and is being worn by a player, the HOTD 500 will not provide an alert to the player signaling that the player has exceeded a tilt threshold when wearing the device (e.g., see FIG. 16A). When the HOTD 500 has a first amount of tilt 1604 and is being worn by a player, the HOTD 500 will also not provide an alert to the player signaling that the player has exceeded a tilt threshold when wearing the device (e.g., see FIG. 16B). This is because the HOTD 500 has been set in a way that the first amount of tilt 1604 does not exceed the tilt threshold. When the HOTD 500 has a second amount of tilt 1608 and is being worn by a player, the HOTD 500 will provide an alert to the player signaling that the player has exceeded a tilt threshold when wearing the device (e.g., see FIG. 16C). This is because the HOTD 500 has been set in a way that the second amount of tilt 1608 does exceed the tilt threshold. FIGS. 16A, 16B, and 16C also illustrate a baseline direction 1600 and tilt directions 1602 and 1606, respectively. In FIG. 16A, the HOTD 500 is shown having a baseline orientation since it is horizontally aligned with the baseline direction 1600. In FIG. 16B, the HOTD 500 is shown having a first tilt orientation since it is horizontally aligned with a first tilt direction 1602. The first amount of tilt 1604 is the amount of rotational displacement of the HOTD 500 from the baseline orientation (shown in FIG. 16A) to the first tilt orientation (shown in FIG. 16B). In FIG. 16C, the HOTD 500 is shown having a second tilt orientation since it is horizontally aligned with a second tilt direction 1606. The second amount of tilt 1608 is the amount of rotational displacement of the HOTD 500 from the baseline orientation (shown in FIG. 16A) to the second tilt orientation (shown in FIG. 16C).

In some embodiments, the HOTD can be or include an apparatus, having a housing (e.g., see housing parts 402, 403, 502, and 503) and a clip attached to the housing, configured to attach the apparatus to a helmet, hat, or headband (e.g., see clips 410, 412, 510, and 512). The apparatus can also include a position sensor, configured to sense a tilt of the apparatus, continually, while the apparatus is activated (e.g., see multi-axis accelerometer 320, gyroscope 322, and magnetometer 324). The apparatus can also include a computing device (e.g., see computing system 300). The computing device can be configured to retrieve the tilt of the apparatus from the position sensor, repeatedly, while the apparatus is activated. Also, the computing device can be configured to activate an alarm (e.g., see back-side light 414, front-side light 508, and back-side light 514) when the tilt of the apparatus exceeds a tilt threshold. In some embodiments, the tilt threshold is configurable via the computing device and a user interface (e.g., see front-side buttons 404 and 504) on the apparatus (e.g., see methods 1800 and 1900). For example, the user interface can be configured to receive a user input to notify the apparatus to configure the tilt threshold, and the computing device is configured to: receive the user input from the user interface; and set the tilt threshold of the apparatus, in response to receiving the user input, by retrieving the tilt of the apparatus immediately after the user input is received by the computing device.

In some embodiments, the clip is configured to attach to a cage of a facemask (e.g., see FIGS. 8, 9, and 14).

In some embodiments, the apparatus includes a LED, and, in the activation of the alarm, the computing device is configured to activate the LED to output a visible light signal. In some embodiments, the apparatus includes a speaker, and, in the activation of the alarm, the computing device is configured to activate the speaker to output an audible sound. Also, the apparatus can include a vibrator, and, in the activation of the alarm, the computing device is configured to activate the vibrator to output a perceivable vibration signal. Also, the apparatus can include a buzzer, and wherein, in the activation of the alarm, the computing device is configured to activate the buzzer to output a perceivable warning signal. In some embodiments, the apparatus can include a LED and a second LED (e.g., see HOTD 500 which includes front-side light 508 and back-side light 514), and, in the activation of the alarm, the computing device is configured to activate the first LED and the second LED to output respective visible light signals on different sides of the apparatus.

In some embodiments, the position sensor includes a gyroscope configured to sense pitch, roll, and yaw of the apparatus (e.g., see gyroscope 322). In some embodiments, the position sensor includes a magnetometer (e.g., see magnetometer 324). In some embodiments, the position sensor includes an accelerometer, such as a multi-axis accelerometer (e.g., see multi-axis accelerometer 320). In some embodiments, the position sensor includes some combination of a gyroscope, a magnetometer, or an accelerometer. For example, in some embodiments, the position sensor includes a gyroscope, a magnetometer, or an accelerometer, or some combination thereof.

In some embodiments, the computing device is configured to activate the alarm when the tilt of the apparatus exceeds the tilt threshold over a certain duration of time. And, the certain duration of time can be configurable via the computing device and a user interface on the apparatus (e.g., see front-side buttons 404 and 504). In some embodiments, the computing device is configured to activate the alarm when the tilt of the apparatus exceeds the tilt threshold over a certain amount of time, and the certain amount of time is configurable via the computing device and the user interface.

In some embodiments, the apparatus can include a wireless transceiver, configured to: communicate with other devices over a network (e.g., see network 104); and communicate information sensed by the position sensor.

In some embodiments, the apparatus, can be configured to attach to a sport helmet in general with or without a clip and by some other attachment mechanism such as Velcro. In some other embodiments, the apparatus is integrated into a sport helmet, such as during the manufacturing of the helmet.

Figure 17:
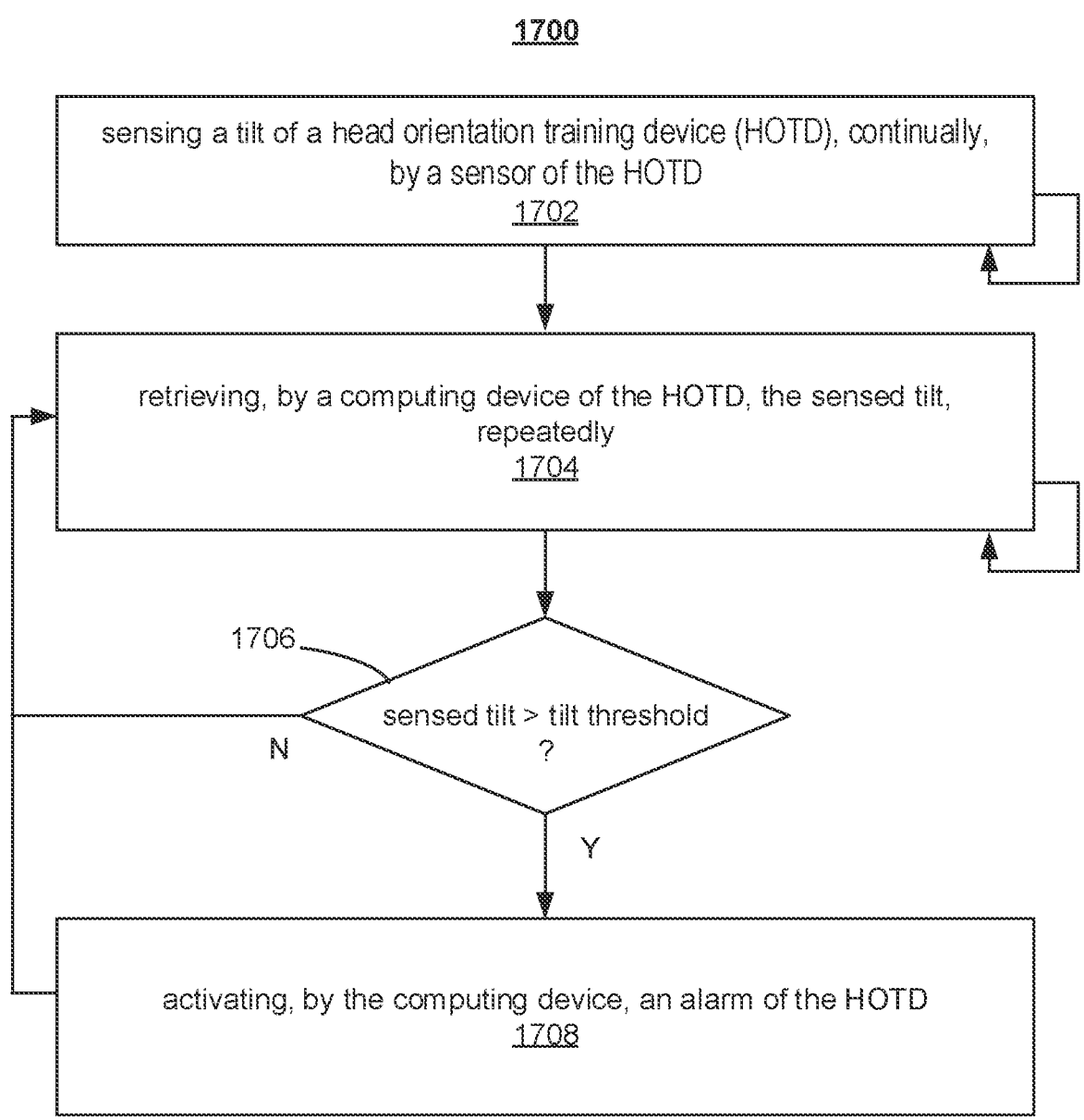
Figure 18:
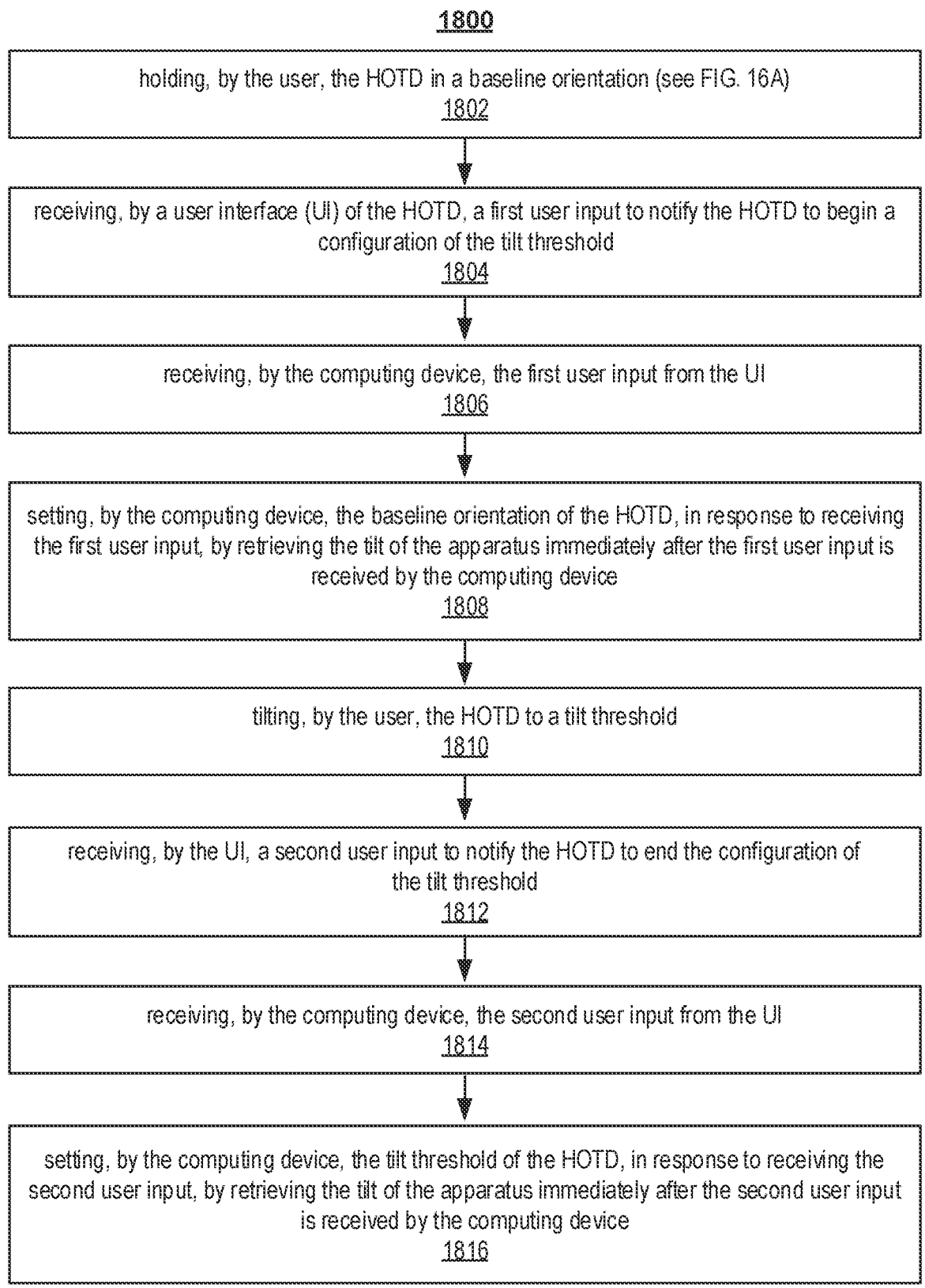

FIGS. 17, 18, and 19 illustrate example methods, in accordance with some embodiments of the present disclosure, that can be performed by aspects of or related to a HOTD. FIGS. 17, 18, and 19 illustrate methods 1700, 1800, and 1900, respectively. Specifically, FIG. 17 shows the steps of method 1700, FIG. 18 shows steps of method 1800, and FIG. 19 shows steps of method 1900. In some embodiments, step 1702 and is performed by a position sensor or one or more position sensors (e.g., see multi-axis accelerometer 320, gyroscope 322, and magnetometer 324). In some embodiments, steps 1704, 1706, 1708, 1806, 1808, 1814, 1816, 1906, and 1908 are performed by a computing system (e.g., see computing systems 102, 116, 117, 118, 120, 121, 122, and 300). In some embodiments, steps are performed by a UI (e.g., see user interfaces 216 and 316). And, in some embodiments, steps 1802, 1810, and 1902 are performed by a user of a HOTD. Furthermore, in some embodiments, although not depicted in FIGS. 17, 18, and 19, the methods can include presenting information generated or determined in the methods via a user interface (UI)—such as a UI device that includes a display. Also, in some embodiments, a UI can perform user interaction operations associated with the methods. For example, a user can interact with a UI to at least partially and manually control different operations of a HOTD. The computing device can for the most part control the aforesaid operations, an in such embodiments, a UI can provide an interface for a user to make adjustments to the control of the operations.

Method 1700 illustrates a method of operations of a HOTD, in accordance with some embodiments of the present disclosure. Method 1700 starts with step 1702, which includes sensing, such as by a position sensor, a tilt of a HOTD, continually. Step 1702 can be performed by a position sensor of the HOTD. The method 1700 continues with step 1704, which includes retrieving, by a computing device of the HOTD, the sensed tilt, repeatedly. The method 1700 then continues with step 1706, which includes determining, by a computing device of the HOTD, whether the sensed tilt is greater than a tilt threshold. In some embodiments, the step 7106 can include determining, by a computing device of the HOTD, whether the sensed tilt is greater than a tilt threshold for a certain duration of time or greater than a time duration threshold. The method 1700 then continues with step 1708, which includes activating, by the computing device, an alarm of the HOTD when the sensed tilt exceeds the tilt threshold. As shown, when the tilt threshold is not exceeded, the method 1700 continues with step 1704. And, as shown, the method 1700 can repeatedly perform its steps. In some embodiments, a computing system external to the HOTD can perform one or more of steps 1704, 1706, and 1708.

Method 1800 illustrates a method of configuring a tilt threshold of a HOTD, in accordance with some embodiments of the present disclosure. Method 1800 starts with step 1802, which includes holding, by the user, the HOTD in a baseline orientation (see FIG. 16A). The method 1800 continues with step 1804, which includes receiving, by a user interface (UI) of the HOTD, a first user input to notify the HOTD to begin a configuration of the tilt threshold. The method 1800 then continues with step 1806, which includes receiving, by a computing device (such as a computing system of the HOTD), the first user input from the UI. Then, the method 1800 continues with step 1808, which includes setting, by the computing device, the baseline orientation of the HOTD, in response to receiving the first user input, by retrieving the tilt of the apparatus immediately after the first user input is received by the computing device.

Next, the method 1800 continues with step 1810, which includes tilting, by the user, the HOTD to a tilt threshold (e.g., see FIG. 16C, wherein the tilt is exceeding a tilt threshold). The method 1800 continues with step 1812, which includes receiving, by the UI, a second user input to notify the HOTD to end the configuration of the tilt threshold. The method 1800 continues with step 1814, which includes receiving, by the computing device, the second user input from the UI. And, finally, the method 1800 continues with step 1816, which includes setting, by the computing device, the tilt threshold of the HOTD, in response to receiving the second user input, by retrieving the tilt of the apparatus immediately after the second user input is received by the computing device. In some embodiments, a user configures the tilt threshold by pushing in a calibration button of the HOTD (e.g., see the first user input of step 1804), tilting the HOTD to a selectable tilt for the tilt threshold while continuing to push in the calibration button (e.g., see step 1810), and then finally releasing the calibration button of the HOTD (e.g., see the second user input of step 1812) while maintaining the selectable tilt.

Method 1900 illustrates another method of configuring a tilt threshold of a HOTD, in accordance with some embodiments of the present disclosure. Method 1900 starts with step 1902, which includes tilting, by a user, the HOTD to a tilt threshold. The method 1900 continues with step 1904, which includes receiving, by the UI, a user input to notify the HOTD to configure the tilt threshold. The method 1900 continues with step 1906, which includes receiving, by the computing device, the user input from the UI. And, finally, method 1900 continues with step 1908, which includes setting, by the computing device, the tilt threshold of the HOTD, in response to receiving the user input, by retrieving the tilt of the HOTD immediately after the user input is received by the computing device.

In some embodiments, the HOTD is a wearable sports vision training device mounted on a regulation hockey helmet's facemask. As can be seen in some of the figures, the sports vision training device can be worn on the facemask of a sports helmet through a clamping mechanism with a calibration button, charging port, and ON/OFF switch, a back LED, front LED, and Clamps residing on surfaces of the device. FIG. 3

In some embodiments, the HOTD can be worn on the facemask of a regulation hockey helmet with the front LED facing the inside of the helmet in a position such that the wearer of this regulation hockey helmet may be notified of the Front LED's ON or OFF position in their main or peripheral vision. Although, it is within the scope of this disclosure to wear the device in a way such that the device is fully covered by the helmet and the device resides within the helmet, behind the ear-guard or embedded elsewhere within the regulation hockey helmet. Also, as shown in at least one figure, the HOTD can be worn vertically on the outside of the helmet (e.g., see FIG. 8); but it is within the scope of this disclosure to wear the device horizontally outside of the helmet in such a position that the wearer of this regulation hockey helmet may be notified of the Front LED's ON or OFF position in their main or peripheral vision (e.g., see FIG. 14). Also, the device can be worn vertically on the outside of the helmet, it is within the scope of this disclosure to wear the device on an attachment with purpose of using the invented device in a setting without a helmet in such a position that the wearer of this regulation hockey helmet may be notified of the Front LED's ON or OFF position in their main or peripheral vision or the aural cue of the buzzer.

In some embodiments, the HOTD provided with a front LED which is sufficiently bright and visible to warn the user of a sustained orientation of the helmet indicative of focus placed on the hockey puck or other sports object on the ice rink floor or on a floor surface and indicative of a lack of awareness about the player's surroundings.

In some embodiments, the HOTD is provided with a buzzer which is sufficiently loud and audible to warn the user of a sustained orientation of the head indicative of focus placed on the hockey puck or other sports object on the ice rink floor or on a floor surface and indicative of a lack of awareness about the player's surroundings.

In some embodiments, it is the intended feature that the wearer of the helmet be able to perceive visual or aural cues emitted or generated by the wearable sports vision training device. In turn, the device may be placed on the facemask, worn as an attachment, or embedded elsewhere in the helmet such that the wearer can perceive, with main or peripheral vision, a shift of the Front LED's position from the ON position to the OFF position or the OFF position to the ON position or an aural cue from the integrated buzzer.

Some embodiments can include a wearable sports vision training device having: a main circuit including a detector, embedded board, a front indicator LED, a back indicator LED, a buzzer, a battery to power the detector and embedded board, an ON/OFF switch, and a calibration button worn on the facemask of a regulation hockey helmet by being clamped on to a regulation facemask cage or worn on an attachment; a plastic encasement to protect and house said main circuit including appropriately incised plastic including button extensions for each the button and switch in the aforementioned main circuit; an appropriately placed cutout for the battery; an appropriately placed cutout for the ON/OFF switch; appropriately placed cutouts for indicator LEDs; as well as an appropriately placed cutout to allow a wired connection from the embedded board to a desktop computer, charging mechanism, laptop computer, or another piece of electronics.

In such embodiments and others, the detector can include an acceleration sensor. The acceleration sensor can include a three-axis sensor. The detector can include a nine-axis sensor. Also, the detector can include a gyroscope.

In such embodiments and others, the output indicator can include an LED in the ON position or a buzzer in the ON position.

In such embodiments and others, the device can be operable to set a threshold at which and above which the device will generate a visual cue from an LED and/or an aural cue from a buzzer if and only if the angle of tilt of the device is sustained at the threshold angle. In such embodiments and others, the device is operable to set a threshold time, measured in milliseconds, at which and above which the device will produce a visual cue from an LED or an aural cue from a buzzer if and only if the angle of tilt of the device is sustained at the threshold angle. Also, the output can be operable to indicate whether or not the angle of tilt is more than a user-defined angle. Also, the button to set the angle can exist on the outside of the device. The button to set the threshold time can exist on the outside of the device. A visual or aural cue can be generated when the angle of tilt is equal to or greater than an angle defined by the user.

In such embodiments and others, together with proprietary custom-written software, the HOTD can indicate to the user through a visual cue from the LED or an aural cue from a buzzer the passing of a user-defined angle of tilt optionally for a user-defined threshold of time.

In some embodiments, the HOTD includes or is a wearable sports vision training device with the purpose of establishing the positive habit in ice hockey of disallowing constant or overly-frequent focus on a hockey puck situated on the hockey rink floor or outdoor pavement during training, practice, or gameplay and with the purpose of promoting the positive hockey habit of a player being aware of his or her surroundings including but not limited to teammates, other players, coaches, referees, goals, and rink borders in order to increase the likelihood of the player making a good decision or positive action with the puck and to decrease the likelihood of a player being unaware of an oncoming hit or any other negative situation during gameplay in order to reduce the frequency and severity of injuries during hockey training, practice, and gameplay.

In some embodiments, the HOTD can include a wearable sports vision training device integrated with proprietary custom written software that communicates with an iOS or Android mobile phone application via Bluetooth or other communications Technology.

In some embodiments, the HOTD can include a wearable sports vision training device integrated with proprietary custom written software that communicates with an iOS or Android mobile phone application that communicates information about acceleration, velocity, device position, and time to be processed, graphed, stored on a mobile phone, uploaded to an external database, and displayed to the user with the purpose of showing progress over time, suggestions for training, practice, or gameplay, and precise statistics.

In some embodiments, the HOTD can include a wearable sports vision training device that is operable to set a threshold time, measured in milliseconds, at which and above which the device will produce a visual cue from an LED or an aural cue from a buzzer if and only if the angle of tilt of the device is sustained at the threshold angle.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a predetermined result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that these and similar terms are to be associated with the appropriate physical quantities and are merely convenient labels applied to these quantities. The present disclosure can refer to the action and processes of a computing system, or similar electronic computing device, that manipulates and transforms data represented as physical (electronic) quantities within the computing system's registers and memories into other data similarly represented as physical quantities within the computing system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computing system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computing system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

While the invention has been described in conjunction with the specific embodiments described herein, it is evident that many alternatives, combinations, modifications and variations are apparent to those skilled in the art. Accordingly, the example embodiments of the invention, as set forth herein are intended to be illustrative only, and not in a limiting sense. Various changes can be made without departing from the spirit and scope of the invention.

What is claimed is:

1. An apparatus, comprising:
a housing;
a clip attached to the housing, configured to attach the apparatus to a facemask of a hockey helmet;
a position sensor, configured to sense a tilt of the apparatus, continually, while the apparatus is activated;
a computing device, configured to:
retrieve the tilt of the apparatus from the position sensor, repeatedly, while the apparatus is activated; and
activate an alarm when the tilt of the apparatus exceeds a tilt threshold,
wherein the tilt threshold is configurable via the computing device and a user interface on the apparatus,
wherein the user interface is configured to receive a user input to notify the apparatus to configure the tilt threshold, and wherein the computing device is configured to:
receive the user input from the user interface; and
set the tilt threshold of the apparatus, in response to receiving the user input, by retrieving the tilt of the apparatus immediately after the user input is received by the computing device.

2. The apparatus of claim 1, wherein the clip is configured to attach to a cage of the facemask.

3. The apparatus of claim 1, comprising a light-emitting diode (LED), and wherein, in activation of the alarm, the computing device is configured to activate the LED to output a visible light signal.

4. The apparatus of claim 1, comprising a speaker, and wherein, in activation of the alarm, the computing device is configured to activate the speaker to output an audible sound.

5. The apparatus of claim 1, comprising a vibrator, and wherein, in activation of the alarm, the computing device is configured to activate the vibrator to output a perceivable vibration signal.

6. The apparatus of claim 1, comprising a buzzer, and wherein, in activation of the alarm, the computing device is configured to activate the buzzer to output a perceivable warning signal.

7. The apparatus of claim 1, comprising a first light-emitting diode (LED) and a second LED, and wherein, in activation of the alarm, the computing device is configured to activate the first LED and the second LED to output respective visible light signals on different sides of the apparatus.

8. The apparatus of claim 1, wherein the position sensor includes a gyroscope configured to sense pitch, roll, and yaw of the apparatus.

9. The apparatus of claim 8, wherein the position sensor includes a magnetometer.

10. The apparatus of claim 9, wherein the position sensor includes an accelerometer.

11. The apparatus of claim 9, wherein the position sensor includes a multi-axis accelerometer.

12. The apparatus of claim 1, wherein the position sensor includes an accelerometer.

13. The apparatus of claim 1, wherein the computing device is configured to activate the alarm when the tilt of the apparatus exceeds the tilt threshold over a certain duration of time.

14. The apparatus of claim 13, wherein the certain duration of time is configurable via the computing device and a user interface on the apparatus.

15. The apparatus of claim 1, wherein the computing device is configured to activate the alarm when the tilt of the apparatus exceeds the tilt threshold over a certain amount of time, and wherein the certain amount of time is configurable via the computing device and the user interface.

16. The apparatus of claim 1, comprising a wireless transceiver, configured to: communicate with other devices over a network; and communicate information sensed by the position sensor.

17. An apparatus, comprising:
a clip, configured to attach the apparatus to a facemask of a hockey helmet;
a position sensor, configured to sense a tilt of the apparatus, continually, while the apparatus is activated; and
a computing device, configured to:
retrieve the tilt of the apparatus from the position sensor, repeatedly, while the apparatus is activated; and
activate an alarm of the apparatus when the tilt of the apparatus exceeds a tilt threshold over a certain amount of time,
wherein the tilt threshold is configurable via the computing device and a user interface on the apparatus,
wherein the user interface is configured to receive a user input to notify the apparatus to configure the tilt threshold, and
wherein the computing device is configured to:
receive the user input from the user interface; and
set the tilt threshold of the apparatus, in response to receiving the user input, by retrieving the tilt of the apparatus immediately after the user input is received by the computing device.

18. The apparatus of claim 17, wherein the certain amount of time is configurable via the computing device and the user interface.

19. An apparatus, comprising:
a position sensor, configured to sense a tilt of the apparatus, continually, while the apparatus is activated; and
a computing device, configured to:
retrieve the tilt of the apparatus from the position sensor, repeatedly, while the apparatus is activated; and
activate an alarm of the apparatus when the tilt of the apparatus exceeds a tilt threshold over a certain amount of time,
wherein the apparatus is integrated into a hockey helmet,
wherein the tilt threshold is configurable via the computing device and a user interface on the apparatus,
wherein the user interface is configured to receive a user input to notify the apparatus to configure the tilt threshold, and
wherein the computing device is configured to:
receive the user input from the user interface; and
set the tilt threshold of the apparatus, in response to receiving the user input, by retrieving the tilt of the apparatus immediately after the user input is received by the computing device.

20. The apparatus of claim 19, wherein the certain amount of time is configurable via the computing device and the user interface.

* * * * *